(12) United States Patent
Wang et al.

(10) Patent No.: US 12,519,303 B2
(45) Date of Patent: Jan. 6, 2026

(54) HYBRID CIRCUIT BREAKER AND PRE-CHARGE CONTROL METHOD

(71) Applicant: Delta Electronics, Inc., Taipei (TW)

(72) Inventors: Ruxi Wang, Durham, NC (US); Boxue Hu, Durham, NC (US); Jui-Chien Hung, Taipei (TW); Chi Zhang, Durham, NC (US); Anup Anurag, Durham, NC (US); Peter Mantovanelli Barbosa, Durham, NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 18/371,971

(22) Filed: Sep. 22, 2023

(65) Prior Publication Data

US 2025/0105613 A1    Mar. 27, 2025

(51) Int. Cl.
*H02M 3/00* (2006.01)
*H01H 89/00* (2006.01)
*H02H 3/05* (2006.01)

(52) U.S. Cl.
CPC .............. *H02H 3/05* (2013.01); *H01H 89/00* (2013.01)

(58) Field of Classification Search
CPC ................................. H02H 3/05; H01H 89/00
See application file for complete search history.

(56) References Cited

U.S. PATENT DOCUMENTS 9,742,185 B2    8/2017  Wang et al.
11,211,215 B2  12/2021  Wang 2018/0138687 A1*  5/2018  Yang ...................... H01H 9/542
2020/0403396 A1  12/2020  Chen
2021/0367422 A1* 11/2021  Li .......................... H01H 89/00
2022/0006281 A1   1/2022  Shen et al.

FOREIGN PATENT DOCUMENTS

| CN | 102832026 B | 8/2015 |
| CN | 105680455 B | 12/2017 |
| CN | 207251194 U | 4/2018 |
| CN | 109314004 A | 2/2019 |
| CN | 113012894 A | 6/2021 |

(Continued)

OTHER PUBLICATIONS

M. Callavik, et al., "The hybrid HVDC breaker," ABB Grid Systems Technical Paper, vol. 361, pp. 143-152, 2012.

(Continued)

*Primary Examiner* — Adolf D Berhane
*Assistant Examiner* — Afework S Demisse
(74) *Attorney, Agent, or Firm* — KIRTON McCONKIE; Evan R. Witt

(57) ABSTRACT

A hybrid circuit breaker and a pre-charge control method are provided. The hybrid circuit breaker includes an outer branch, a first branch, a first mechanical switch module, a second branch, an electronic switch and a current commutation circuit. The first branch is connected with the outer branch in series. The first mechanical switch module is located on the first branch. The second branch is connected with the first branch in parallel. The electronic switch is located on the second branch. The current commutation circuit includes a voltage source module and an inductor. The voltage source module is located on the second branch. The inductor is located on one of the first branch or the second branch.

14 Claims, 23 Drawing Sheets

(56) References Cited

FOREIGN PATENT DOCUMENTS

| | | | |
|---|---|---|---|
| CN | 113013832 | A | 6/2021 |
| CN | 114373613 | A | 4/2022 |
| CN | 115459297 | A | 12/2022 |
| CN | 115603293 | A | 1/2023 |
| JP | 2017130391 | A | 7/2017 |
| TW | 200901593 | A | 1/2009 |
| TW | 201342761 | A | 10/2013 |
| WO | 2017186262 | A1 | 11/2017 |

OTHER PUBLICATIONS

W. Wen, et al. "Research on Current Commutation Measures for Hybrid DC Circuit Breakers," in IEEE Transactions on Power Delivery, vol. 31, No. 4, pp. 1456-1463, Aug. 2016.

Y. Zhou, et al. "An Ultraefficient DC Hybrid Circuit Breaker Architecture Based on Transient Commutation Current Injection," in IEEE Journal of Emerging and Selected Topics in Power Electronics, vol. 9, No. 3, pp. 2500-2509, Jun. 2021.

Ravi, et al. "Electronic MOV-Based Voltage Clamping Circuit for DC Solid-State Circuit Breaker Applications," in IEEE Transactions on Power Electronics, vol. 37, No. 7, pp. 7561-7565, Jul. 2022.

K. Liu et al. "A Novel Solid-State Switch Scheme With High Voltage Utilization Efficiency by Using Modular Gapped MOV for DC Breakers," in IEEE Transactions on Power Electronics, vol. 37, No. 3, pp. 2502-2507, Mar. 2022.

Littlefuse, Application Note, "High Power Semiconductor Crowbar Protector for AC Power Line Applications", 2022.

V. Zorngiebel, et al. "Compact High Voltage IGBT Switch for Pulsed Power Applications," 2008 14th Symposium on Electromagnetic Launch Technology, Victoria, BC, Canada, 2008, pp. 1-5.

M. Zarghani, et al. "Voltage Balancing of Series IGBTs in Short-Circuit Conditions," in IEEE Transactions on Power Electronics, vol. 37, No. 5, pp. 5675-5686, May 2022.

IEEE 100, The Authoritative Dictionary of IEEE Standards Terms, Seventh Edition, Dec. 2000.

\* cited by examiner

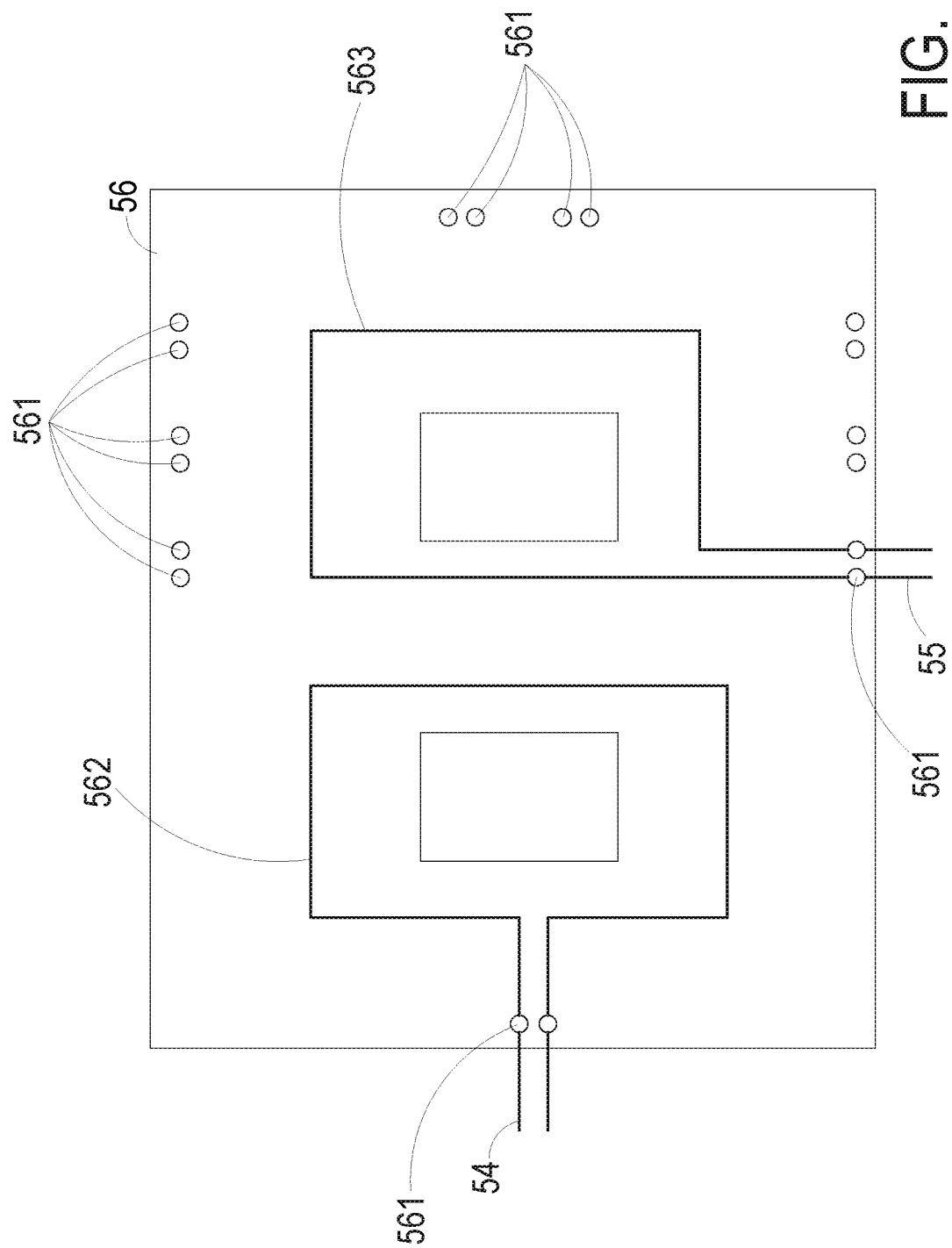

J1 — A first phase voltage of the three-phase voltage is provided to the first hybrid circuit breaker through the first phase terminal. A second phase voltage of the three-phase voltage is provided to the second hybrid circuit breaker through the second phase terminal. A third phase voltage of the three-phase voltage is provided to the third hybrid circuit breaker through the third phase terminal.

J2 — The first hybrid circuit breaker, the second hybrid circuit breaker and the third hybrid circuit breaker are controlled in an off state.

J3 — The first hybrid circuit breaker is controlled to turn on when the first phase voltage of the three-phase voltage is equal to zero.

J4 — The second hybrid circuit breaker is controlled to turn on when the first phase voltage of the three-phase voltage is equal to the second phase voltage of the three-phase voltage.

J5 — The third hybrid circuit breaker is controlled to turn on when the third phase voltage of the three-phase voltage is equal to zero.

FIG. 20

HYBRID CIRCUIT BREAKER AND PRE-CHARGE CONTROL METHOD

FIELD OF THE INVENTION

The present disclosure relates to a circuit breaker, and more particularly to a hybrid circuit breaker and a pre-charge control method.

BACKGROUND OF THE INVENTION

The hybrid circuit breaker plays a key role in medium voltage power system. For example, the voltage of the medium voltage power system is between 1 kV to 100 kV. The hybrid circuit breaker is connected between the electric load and the power source so as to connect or disconnect the electric load and the power source according to control commands and operation conditions. The main function of the hybrid circuit breaker is to protect the electric device against overloading conditions, and isolate faulty devices from the rest elements of the medium voltage power system. However, conventional hybrid circuit breakers must have at least one high-voltage rated mechanical switch for galvanic isolation. The cost of the high-voltage rated mechanical switch is high. The conventional hybrid circuit breakers perform circuit current commutation using electronic switches in series with the high-voltage rated mechanical switch. The electronic switches have disadvantages of high conduction loss and low operation reliability. Moreover, the conventional hybrid circuit breakers need additional bypass switch and resistor to achieve a pre-charge operation function so as to increase cost and volume of the hybrid circuit breaker.

Therefore, there is a need of providing a hybrid circuit breaker and a pre-charge control method to obviate the drawbacks encountered from the prior arts.

SUMMARY OF THE INVENTION

The present disclosure provides a hybrid circuit breaker and a pre-charge control method. By utilizing the hybrid circuit breaker of the present disclosure, the mechanical switch module in the hybrid circuit breaker can have galvanic isolation function using switch elements. The hybrid circuit breaker can achieve a pre-charge operation function without additional bypass switch and resistor. Consequently, the cost and volume of the hybrid circuit breaker are reduced.

In accordance with an aspect of the present disclosure, a hybrid circuit breaker is provided. The hybrid circuit breaker includes an outer branch, a first branch, a first mechanical switch module, a second branch, an electronic switch and a current commutation circuit. The first branch is connected with the outer branch in series. The first mechanical switch module is located on the first branch. The second branch is connected with the first branch in parallel. The electronic switch is located on the second branch. The current commutation circuit includes a voltage source module and a first inductor. The voltage source module is located on the second branch. The first inductor is located on one of the first branch or the second branch.

In accordance with another aspect of the present disclosure, a pre-charge control method is provided for a DC circuit system. The DC circuit system includes a switch circuit, a power source and a capacitor module. The switch circuit is connected between the power source and the capacitor module. The pre-charge control method includes the following steps. Firstly, the switch circuit is provided. The switch circuit includes at least one electronic switch and at least one clamping circuit. Then, the at least one electronic switch is controlled in an off state. Then, the at least one electronic switch is controlled to turn on according to a pre-charge command. Then, a charging current flowing into the switch circuit is detected. Then, the at least one electronic switch is controlled to turn off when the charging current reaching a limit current value. The charging current is gradually reduced due to the limitation of the at least one clamping circuit. Then, the at least one electronic switch is controlled to turn on according to a pre-charge signal. Then, the switch circuit is controlled to turn on when reaching a pre-charge end condition.

In accordance with another aspect of the present disclosure, a pre-charge control method is provided for a three-phase AC circuit system. The three-phase AC circuit system includes a first hybrid circuit breaker, a second hybrid circuit breaker, a third hybrid circuit breaker and an AC power source. The AC power source provides a three-phase voltage and includes a first phase terminal, a second phase terminal and a third phase terminal. The pre-charge control method includes the following steps. Firstly, a first phase voltage of the three-phase voltage is provided to the first hybrid circuit breaker through the first phase terminal. A second phase voltage of the three-phase voltage is provided to the second hybrid circuit breaker through the second phase terminal. A third phase voltage of the three-phase voltage is provided to the third hybrid circuit breaker through the third phase terminal. Then, the first hybrid circuit breaker, the second hybrid circuit breaker and the third hybrid circuit breaker are controlled in an off state. Then, the first hybrid circuit breaker is controlled to turn on when the first phase voltage of the three-phase voltage is equal to zero. Then, the second hybrid circuit breaker is controlled to turn on when the first phase voltage of the three-phase voltage is equal to the second phase voltage of the three-phase voltage. Then, the third hybrid circuit breaker is controlled to turn on when the third phase voltage of the three-phase voltage is equal to zero.

The above contents of the present disclosure will become more readily apparent to those ordinarily skilled in the art after reviewing the following detailed description and accompanying drawings, in which:

BRIEF DESCRIPTION OF THE DRAWINGS

FIG. 14A is a schematic perspective view illustrating a layer of the circuit board of the magnetic device of FIG. 13;

FIG. 20 is a flowchart illustrating a pre-charge control method applied to the hybrid circuit breaker of FIG. 18.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
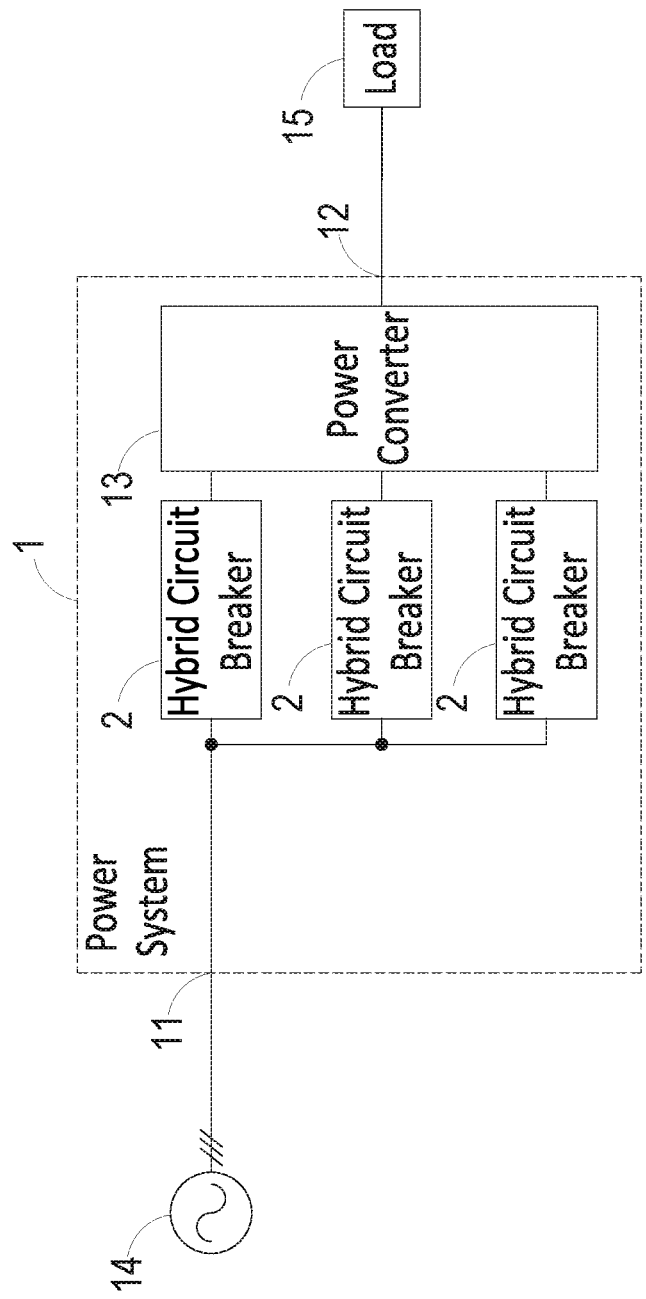
FIG. 1 is a schematic circuit diagram illustrating a power system having a plurality of hybrid circuit breakers of the present disclosure.
Figure 2:
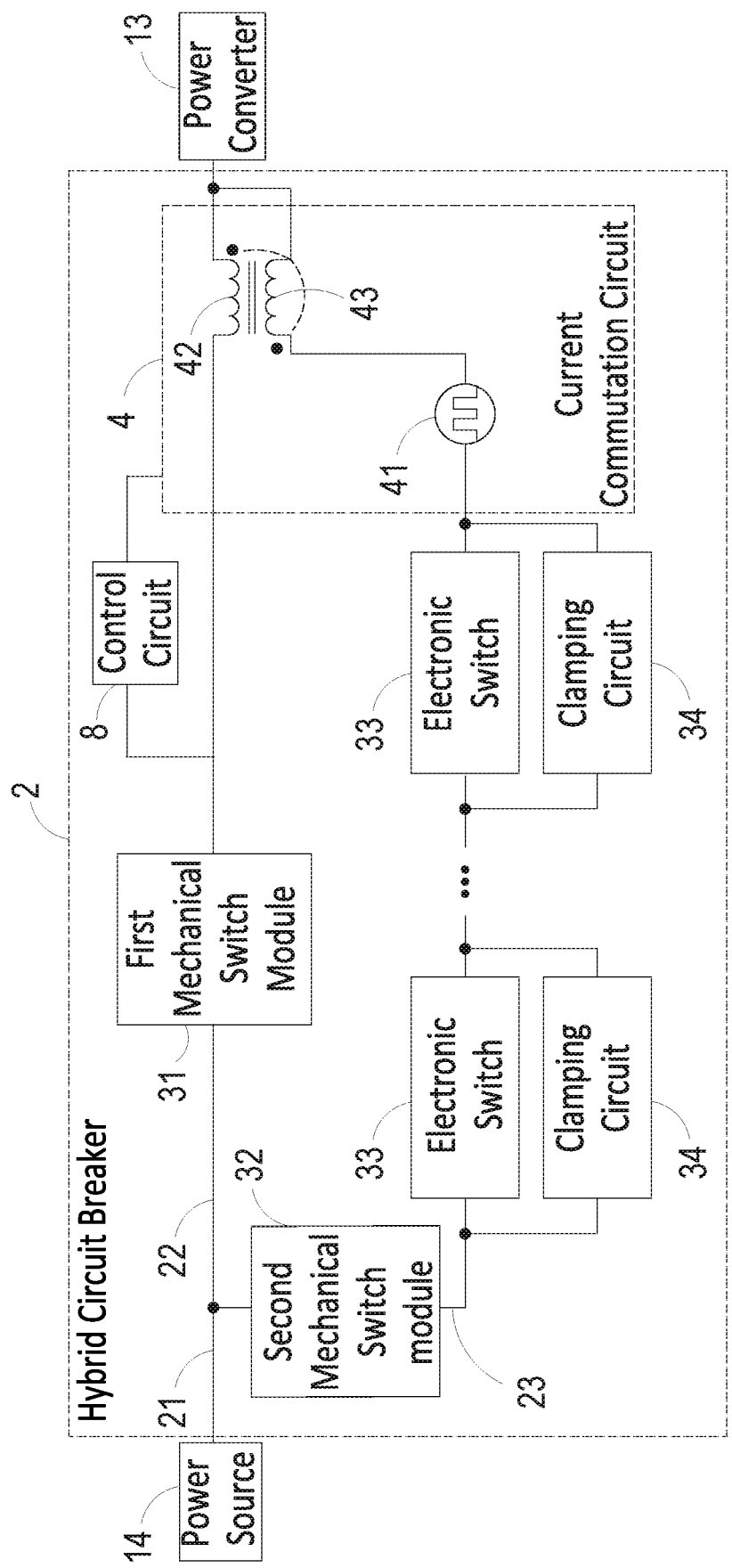
FIG. 2 is a schematic circuit diagram illustrating the hybrid circuit breaker according to a first embodiment of the present disclosure.

FIG. 1 is a schematic circuit diagram illustrating a power system having a plurality of hybrid circuit breakers of the present disclosure. FIG. 2 is a schematic circuit diagram illustrating the hybrid circuit breaker according to a first embodiment of the present disclosure. As shown in FIG. 1, the power system 1 is connected between a power source 14 and a load 15. Preferably but not exclusively, the power source 14 is a medium-voltage grid, which can be a DC circuit system or an AC circuit system. The power system 1 includes an input terminal 11, an output terminal 12, a plurality of hybrid circuit breakers 2 and a power converter 13. The power system 1 is connected with the power source 14 through the input terminal 11. The power system 1 is connected with the load 15 through the output terminal 12. The power system 1 transforms the electric power of the power source 14 to the load 15. Each hybrid circuit breaker 2 is connected between the input terminal 11 and the power converter 13. The power converter 13 is connected between the corresponding hybrid circuit breaker 2 and the output terminal 12.

As shown in FIG. 2, the hybrid circuit breaker 2 includes an outer branch 21, a first branch 22, a second branch 23, a first mechanical switch module 31, a second mechanical switch module 32, a plurality of electronic switches 33, a plurality of clamping circuits 34 and a current commutation circuit 4 and a control circuit 8. The outer branch 21 is connected with the power source 14 through the input terminal 11 of the power system 1. The first branch 22 is connected between the outer branch 21 and the power converter 13. The outer branch 21 and the first branch 22 are connected in series between the power source 14 and the power converter 13. The second branch 23 is connected with the first branch 22 in parallel. The first mechanical switch module 31 is located on the first branch 22. The second mechanical switch module 32 is located on the second branch 23. The plurality of electronic switches 33 are located on the second branch 23 and connected with the second mechanical switch module 32 in series. The number of the clamping circuit 34 is equal to the number of the electronic switch 33. Each clamping circuit 34 is located on the second branch 23 and connected with the corresponding electronic switch 33 in parallel.

The current commutation circuit 4 includes a voltage source module 41, a first inductor 42 and a second inductor 43. The voltage source module 41 is located on the second branch 23. The first inductor 42 is located on the first branch 22. The second inductor 43 is located on the second branch 23 and connected with the voltage source module 41 in series. In this embodiment, the second inductor 43 and the first inductor 42 are coupled with each other, and the mutual inductance between the second inductor 43 and the first inductor 42 is greater than zero. In an embodiment, the second inductor 43 and the first inductor 42 are not coupled with each other, and the mutual inductance between the second inductor 43 and the first inductor 42 is zero. The control circuit 8 is connected with the current commutation circuit 4 and the first branch 22. The control circuit 8 controls the operation of the current commutation circuit 4 according to the information of the first branch 22. The detail control method of the control circuit 8 will be described as below.

In this embodiment, the first mechanical switch module 31 and the second mechanical switch module 32 have galvanic isolation function, respectively. The first mechanical switch module 31 (or the second mechanical switch module 32) can be formed by single high-voltage rated mechanical switch or plural low-voltage rated mechanical switches connected in series. Each of the low-voltage rated mechanical switches has conductor parts with fixed parasitic capacitance value connected in parallel. The detail structure of the mechanical switch will be described below.

From above, the hybrid circuit breaker 2 of the present disclosure includes the second mechanical switch module 32 located on the second branch 23. Compared with the conventional hybrid circuit breaker, the first mechanical switch module 31 and the second mechanical switch module 32 can use plural low-voltage rated mechanical switches connected in series to replace a high-voltage rated mechanical switch while maintain galvanic isolation function, respectively. The cost of the first mechanical switch module 31 and the second mechanical switch module 32 of the hybrid circuit breaker 2 is reduced. Moreover, there is no electronic switch connected in series with the first mechanical switch module 31 on the first branch 22. The power loss and operation reliability of the hybrid circuit breaker 2 are improved.

Figure 3:
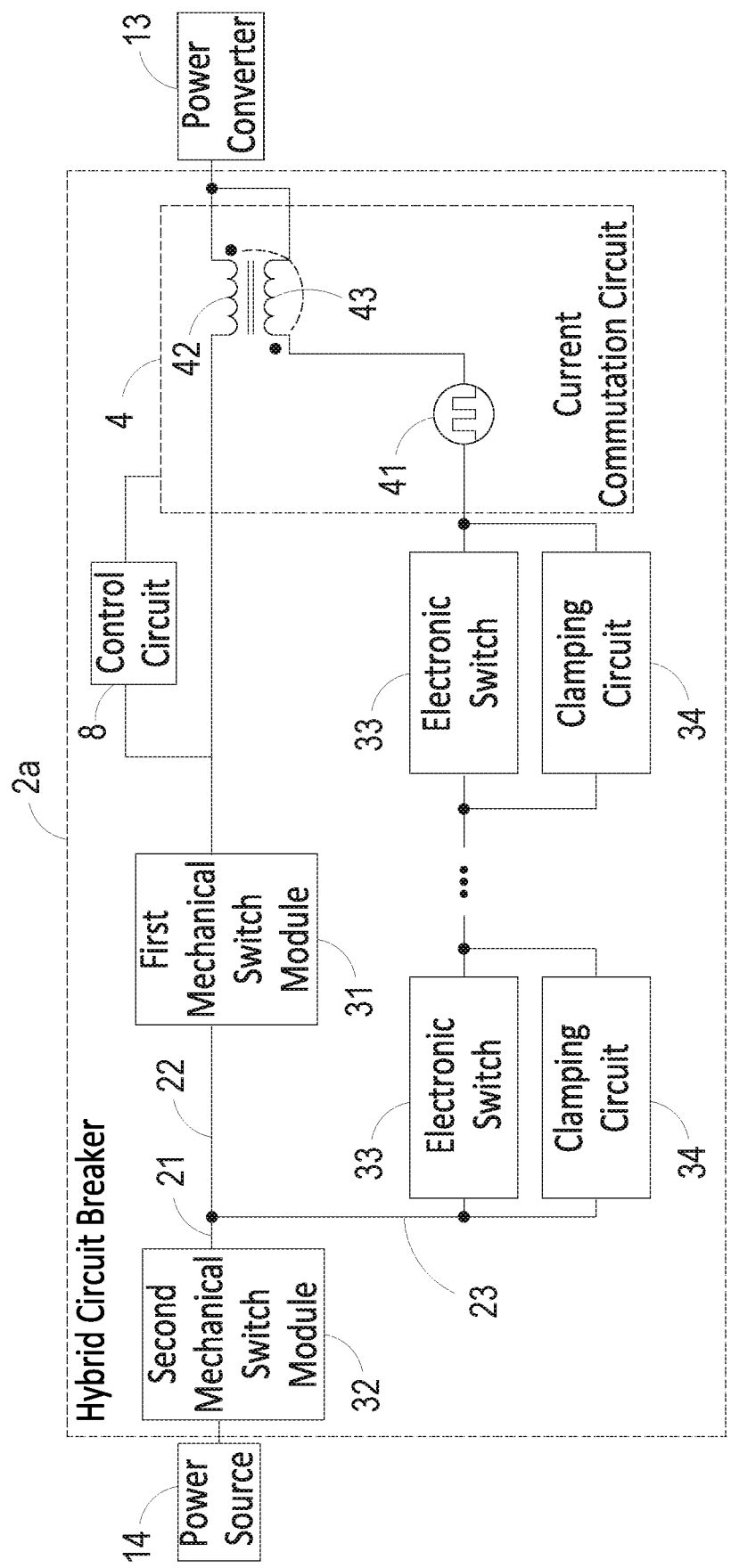
FIG. 3 is a schematic circuit diagram illustrating the hybrid circuit breaker according to a second embodiment of the present disclosure.

FIG. 3 is a schematic circuit diagram illustrating the hybrid circuit breaker according to a second embodiment of the present disclosure. As shown in FIG. 3, the hybrid circuit breaker 2a of this embodiment is similar to the hybrid circuit breaker 2 of FIG. 2. In this embodiment, the second mechanical switch module 32 of the hybrid circuit breaker 2a is located on the outer branch 21. In this embodiment, the second mechanical switch module 32 has galvanic isolation function, but the first mechanical switch module 31 does not have galvanic isolation function. The first mechanical switch module 31 can be formed by single high-voltage rated mechanical switch or plural low-voltage rated mechanical switches connected in series, each of the low-voltage rated mechanical switch has a resistor and/or a capacitor connected in parallel. The second mechanical switch module 32 can be formed by single high-voltage rated mechanical switch or plural low-voltage rated mechanical switches connected in series, each of the low-voltage rated mechanical switch has conductor parts with fixed parasitic capacitance value connected in parallel. The detail structure of the mechanical switch will be described below.

Figure 4:
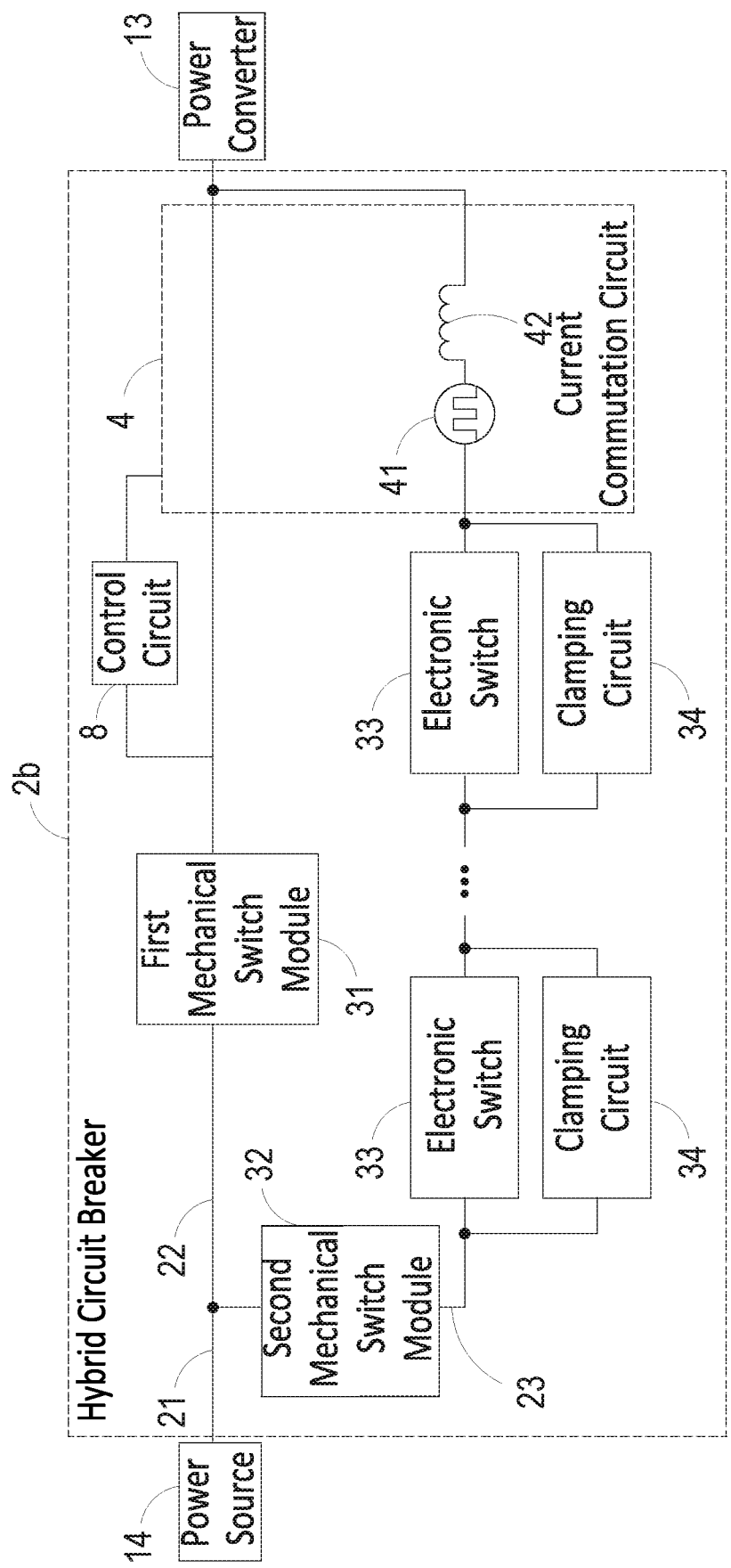
FIG. 4 is a schematic circuit diagram illustrating the hybrid circuit breaker according to a third embodiment of the present disclosure.

FIG. 4 is a schematic circuit diagram illustrating the hybrid circuit breaker according to a third embodiment of the present disclosure. As shown in FIG. 4, the hybrid circuit breaker 2b of this embodiment is similar to the hybrid circuit breaker 2 of FIG. 2. In this embodiment, the current commutation circuit 4 of the hybrid circuit breaker 2b does not have two inductors but only one inductor, such as the first inductor 42. The first inductor 42 is located on the second branch 23 and connected with the voltage source module 41 in series.

Figure 5:
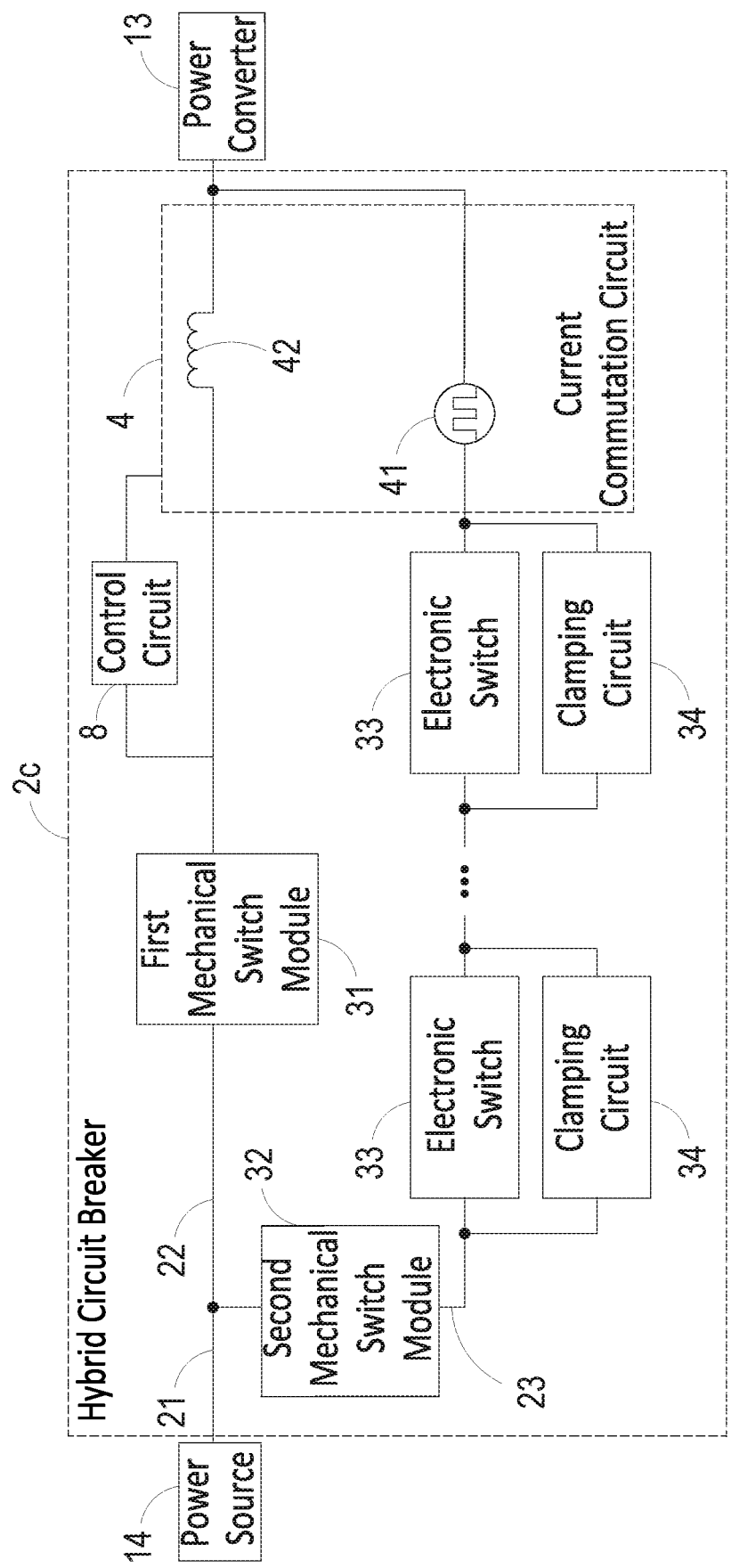
FIG. 5 is a schematic circuit diagram illustrating the hybrid circuit breaker according to a fourth embodiment of the present disclosure.

FIG. 5 is a schematic circuit diagram illustrating the hybrid circuit breaker according to a fourth embodiment of the present disclosure. As shown in FIG. 5, the hybrid circuit breaker 2c of this embodiment is similar to the hybrid circuit breaker 2 of FIG. 2. In this embodiment, the current commutation circuit 4 of the hybrid circuit breaker 2c does not have two inductors but only one inductor, such as the first inductor 42. The first inductor 42 is located on the first branch 22 and connected with the first mechanical switch module 31 in series.

Figure 6:
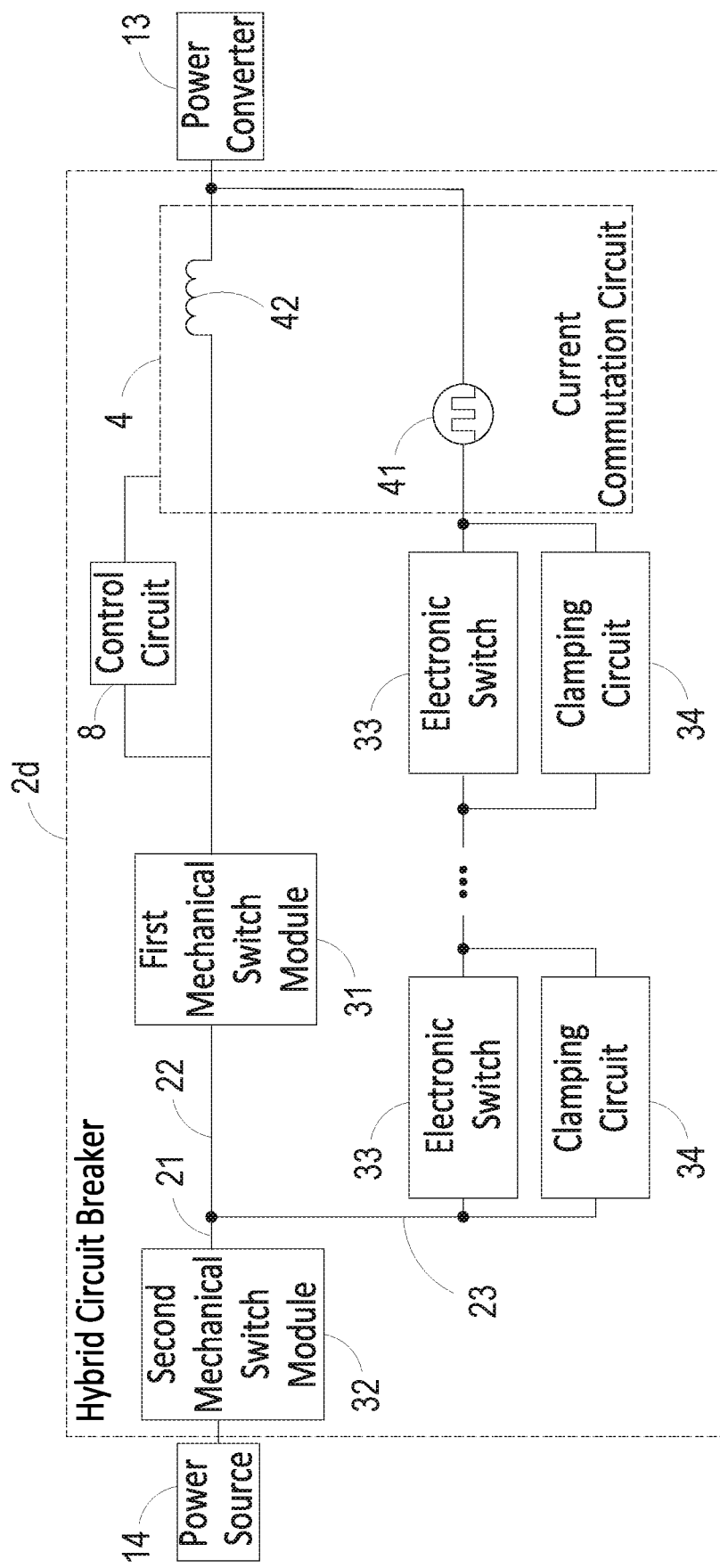
FIG. 6 is a schematic circuit diagram illustrating the hybrid circuit breaker according to a fifth embodiment of the present disclosure.

FIG. 6 is a schematic circuit diagram illustrating the hybrid circuit breaker according to a fifth embodiment of the present disclosure. As shown in FIG. 6, the hybrid circuit breaker 2d of this embodiment is similar to the hybrid circuit breaker 2 of FIG. 2. In this embodiment, the second mechanical switch module 32 of the hybrid circuit breaker 2a is located on the outer branch 21. The current commutation circuit 4 of the hybrid circuit breaker 2c does not have two inductors but only one inductor, such as the first inductor 42. The first inductor 42 is located on the first branch 22 and connected with the first mechanical switch module 31 in series.

Figure 7:
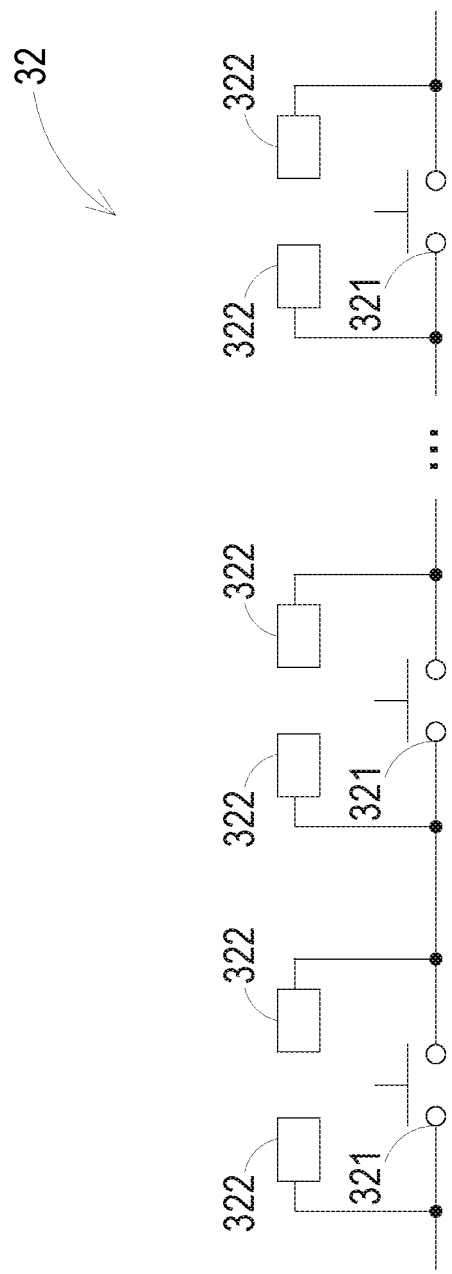
FIG. 7 is a schematic circuit diagram illustrating the second mechanical switches of the hybrid circuit breaker of the present disclosure.

FIG. 7 is a schematic circuit diagram illustrating the second mechanical switch module of the hybrid circuit breaker of the present disclosure. As shown in FIG. 7, the second mechanical switch module 32 includes a plurality of switch elements 321 and a plurality of conductor parts 322. The number of the conductor parts 322 is twice than the number of the switch elements 321. The switch element 321 is a low-voltage rated mechanical switch. The plurality of switch elements 321 are connected in series. Every two conductor parts 322 are connected with the corresponding switch element 321 in parallel. A fixed parasitic capacitance value is between the two conductor parts 322. In other words, the two conductor parts 322 have sufficient voltage insulation ability and well-designed parasitic capacitance utilizing for voltage balance of switch element 321 while maintaining galvanic isolation. In some embodiments, the two conductor parts 322 are formed by two metal parts with fixed shape, dimensions, distances, and position. For example, the two conductor parts 322 are two metal terminals soldered on a PCB, or two twisted wires with specific twist turn and length, or two windings in a transformer. The connection relationship between the conductor part 322 and the switch element 321 is not limited. Certainly, in some embodiments, the first mechanical switch module 31 can include a switch element 321 and two conductor parts 322, and is not redundantly described hereinafter.

Figure 8A:
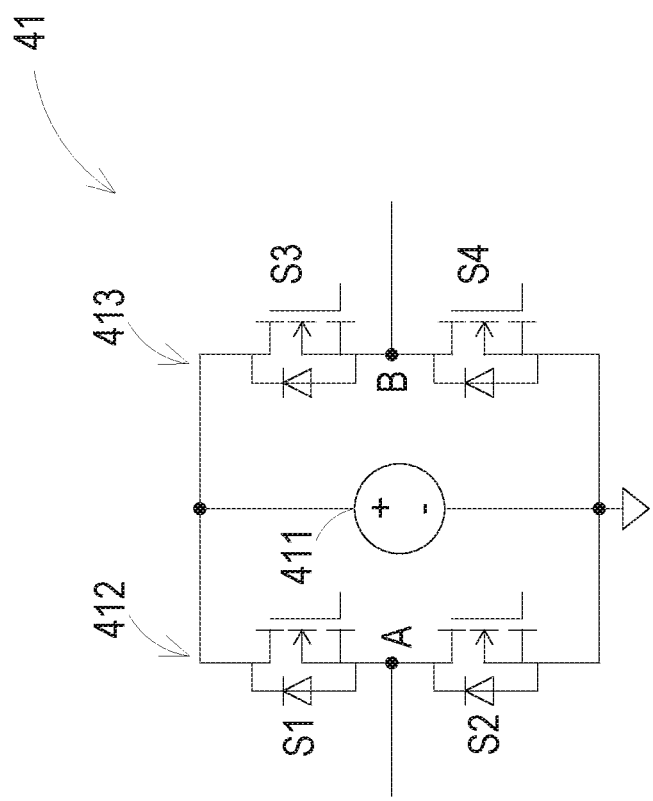
FIGS. 8A to 8C are schematic circuit diagrams illustrating the voltage source module of the current commutation circuit of the hybrid circuit breaker of the present disclosure.
Figure 8B:
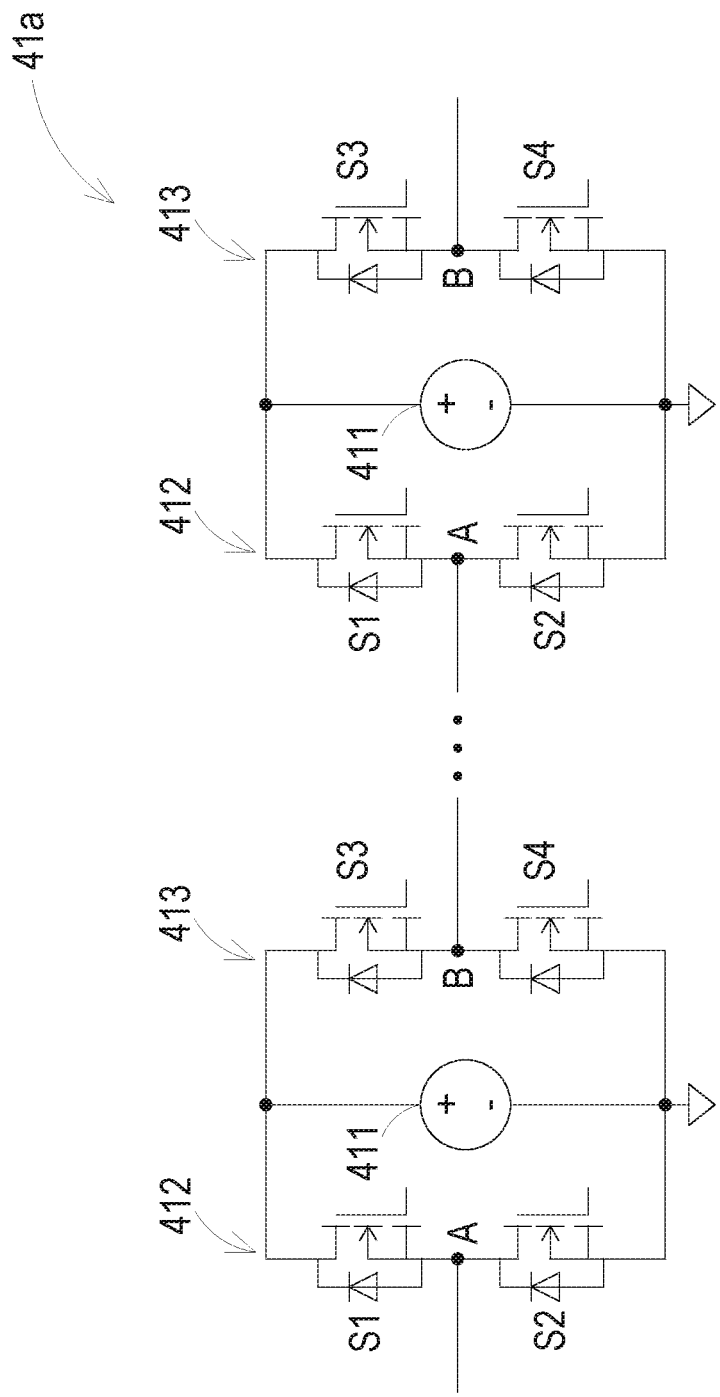
Figure 8C:
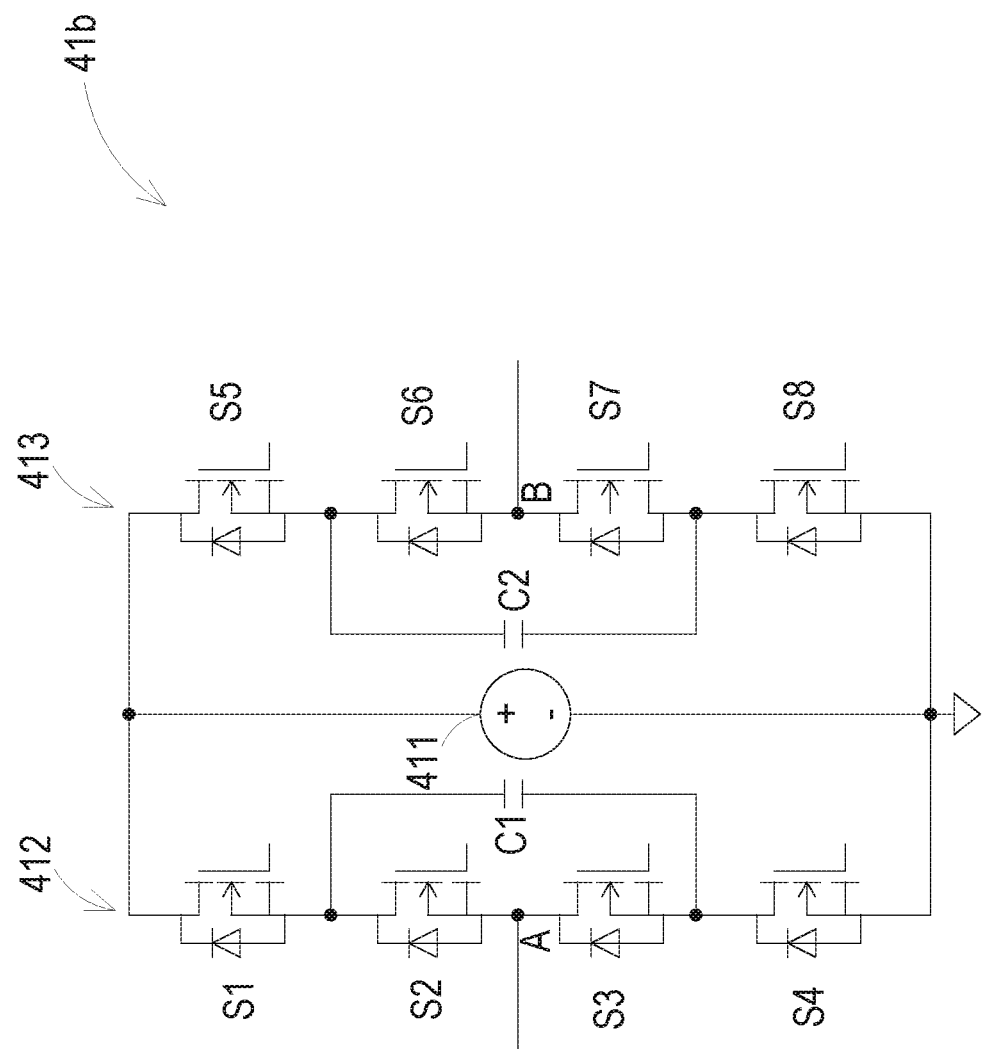

FIGS. 8A to 8C are schematic circuit diagrams illustrating the voltage source module of the current commutation circuit of the hybrid circuit breaker of the present disclosure. As shown in FIG. 8A, the voltage source module 41 of the first embodiment includes a voltage source 411, a first switch bridge 412 and a second switch bridge 413. The voltage source 411, the first switch bridge 412 and the second switch bridge 413 are connected in parallel. The first switch bridge 412 includes a first switch S1 and a second switch S2. The first switch S1 and the second switch S2 are connected with each other in series with a first node A. The first node A is connected with the electronic switch 33. The second switch bridge 413 includes a third switch S3 and a fourth switch S4. The third switch S3 and the fourth switch S4 are connected with each other in series with a second node B. The second node B is connected with the second inductor 43. In an embodiment, as shown in FIG. 8B, the voltage source module 41a of the second embodiment includes a plurality of the voltage source modules 41 of FIG. 8A. In other words, the plurality of the voltage source modules 41 of FIG. 8A are connected in series to form the voltage source module 41a of the second embodiment.

In an embodiment, as shown in FIG. 8C, the voltage source module 41b of the first embodiment includes a voltage source 411, a first switch bridge 412 and a second switch bridge 413. The voltage source 411, the first switch bridge 412 and the second switch bridge 413 are connected in parallel. The first switch bridge 412 includes a first switch S1, a second switch S2, a third switch S3, a fourth switch S4 and a first capacitor C1. The first switch S1, the second switch S2, the third switch S3 and the fourth switch S4 are connected in series. The second switch S2 and the third switch S3 are connected with a first node A. The first node A is connected with the electronic switch 33. The first capacitor C1 is parallel with a connection of the second switch S2 and the third switch S3. The second switch bridge 413 includes a fifth switch S5, a sixth switch S6, a seventh switch S7, an eighth switch S8 and a second capacitor C2. The fifth switch S5, the sixth switch S6, the seventh switch S7 and the eighth switch S8 are connected in series. The sixth switch S6 and the seventh switch S7 are connected with a second node B. The second node B is connected with the second inductor 43. The second capacitor C2 is parallel with a connection of the sixth switch S6 and the seventh switch S7.

Figure 9:
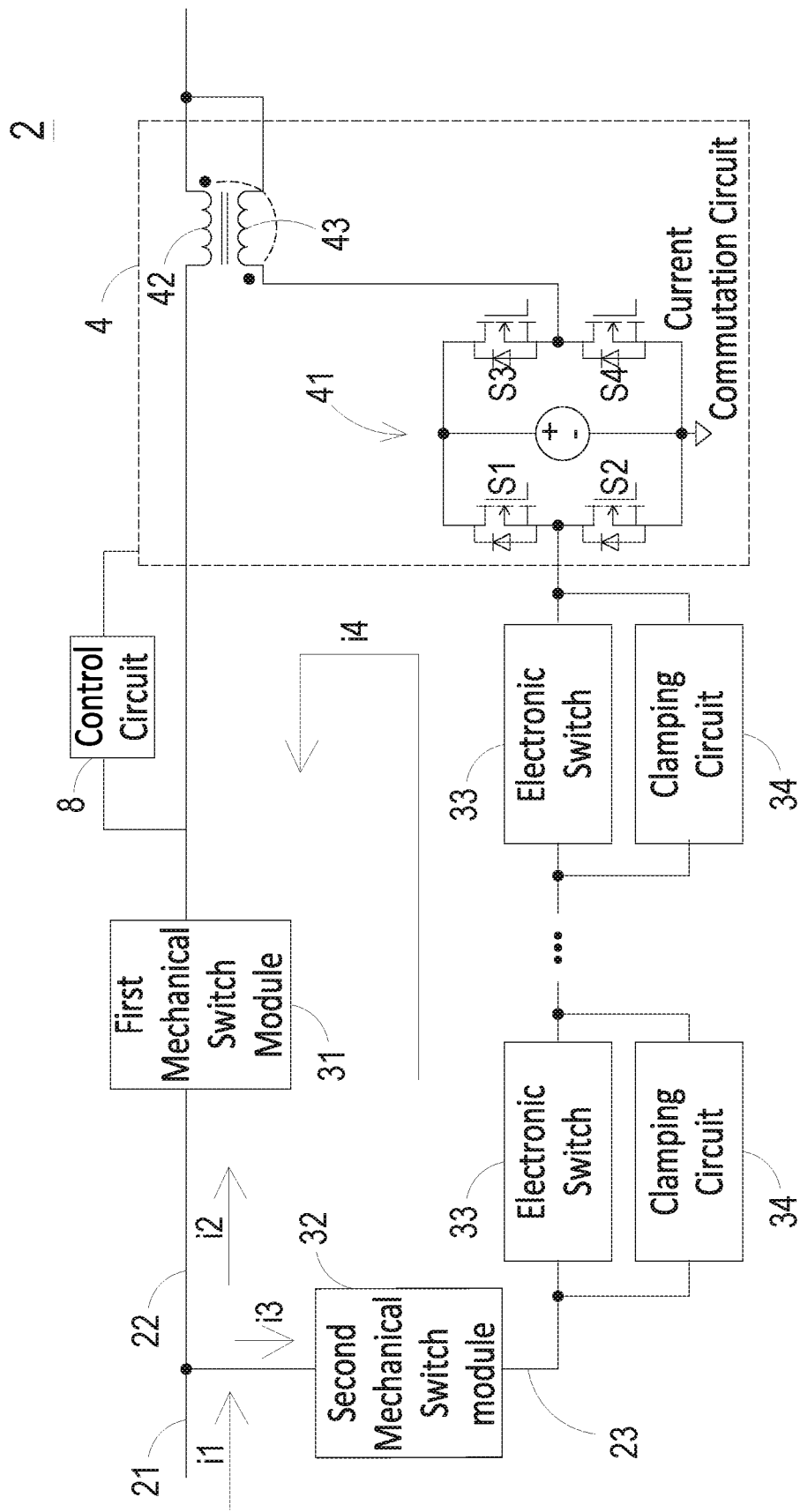
FIG. 9 is a schematic circuit diagram illustrating the current flows of the hybrid circuit breaker of FIG. 2.

FIG. 9 is a schematic circuit diagram illustrating the current flows of the hybrid circuit breaker of FIG. 2. As shown in FIG. 9, when the hybrid circuit breaker 2 receives the power form the power source 14, a first current i1 flows through the outer branch 21, and a second current i2 flows through the first mechanical switch module 31 and the first inductor 42 located on the first branch 22. Under this circumstance, the second mechanical switch module 32 is turned on, but the plurality of electronic switches 33 are turned off. Consequently, the second current i2 is equal to the first current i1, and a third current i3 flowing through the second branch 23 is zero.

When the load 15 stops receiving the power from the power source 14, the plurality of electronic switches 33 are turned on, and the current commutation circuit 4 is enabled. In this embodiment, the current commutation circuit 4 of FIG. 8A is applied to the hybrid circuit breaker 2. When the current commutation circuit 4 is enabled, the switches of the current commutation circuit 4 are controlled to turn on or turn off accordingly, and a fourth current i4 flowing through the first branch 22 and the second branch 23 is created. The fourth current i4 is controlled to equal to the first current i1 according to the operation of the switches of the current commutation circuit 4 so as to control the second current i2 equal to zero. The feature about operation of the switches of the current commutation circuit 4 is described below. Consequently, the second current i2 is equal to zero, and the third current i3 is equal to the first current i1. When the second current i2 is equal to zero, the first mechanical switch module 31 is turned off, the current commutation circuit 4 is disabled, and the plurality of electronic switches 33 are turned off. The third current i3 flows through the clamping circuit 34. The voltage of the electronic switch 33 is clamped by the corresponding clamping circuit 34. The first current i1 is reduced to 0, and the second mechanical switch module 32 is turned off.

Figure 10:
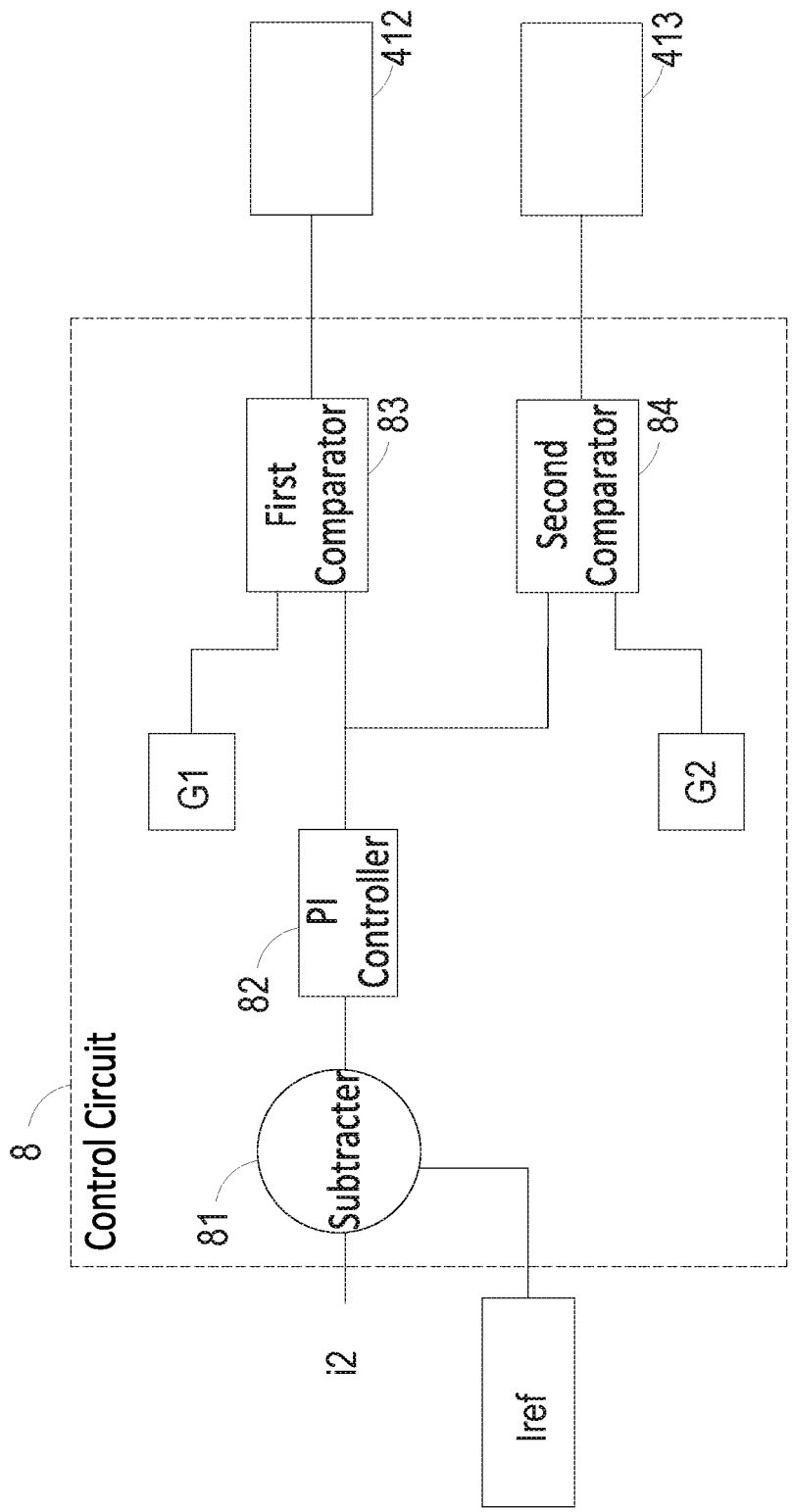
FIG. 10 is a schematic circuit diagram illustrating the control circuit of the hybrid circuit breaker of FIG. 2.

FIG. 10 is a schematic circuit diagram illustrating the control circuit of the hybrid circuit breaker of FIG. 2. As shown in FIGS. 10 and 2, the control circuit 8 is connected with the first branch 22 and the current commutation circuit 4. The control circuit 8 includes a subtracter 81, a PI controller 82, a first comparator 83 and a second comparator 84. The subtracter 81 receives and subtracts the second current i2 and a reference current Iref. The PI controller 82 processes the output of the subtracter 81. The first comparator 83 receives the output of the PI controller 82 and a first signal G1 to output a first PWM signal PWM1 to the first switch bridge 412 of the current commutation circuit 4. The second comparator 84 receives the output of the PI controller 82 and a second signal G2 to output a second PWM signal PWM2 to the second switch bridge 413 of the current commutation circuit 4.

Figure 11:
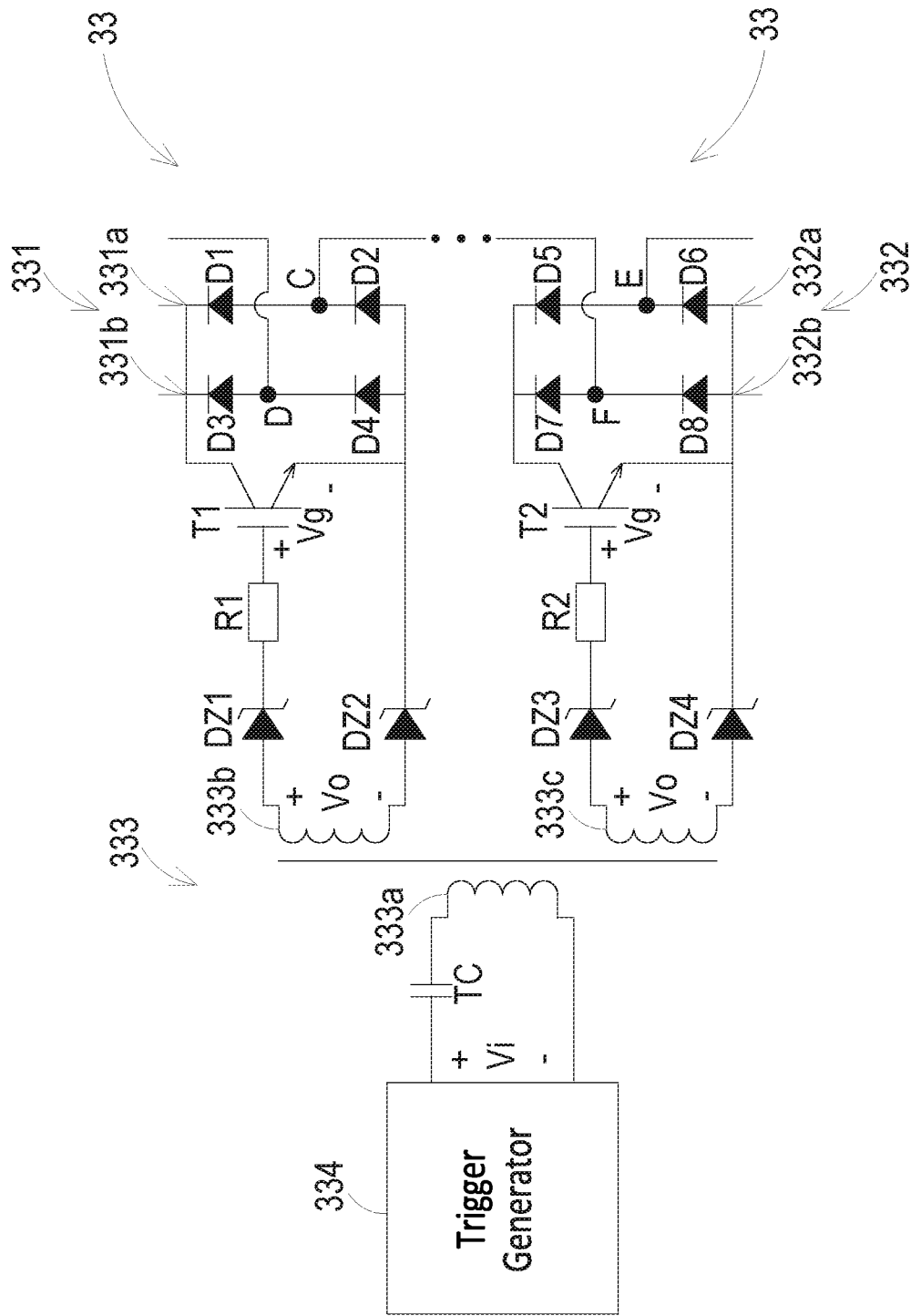
FIG. 11 is a schematic circuit diagram illustrating the electronic switches of the hybrid circuit breaker of FIG. 2.
Figure 12:
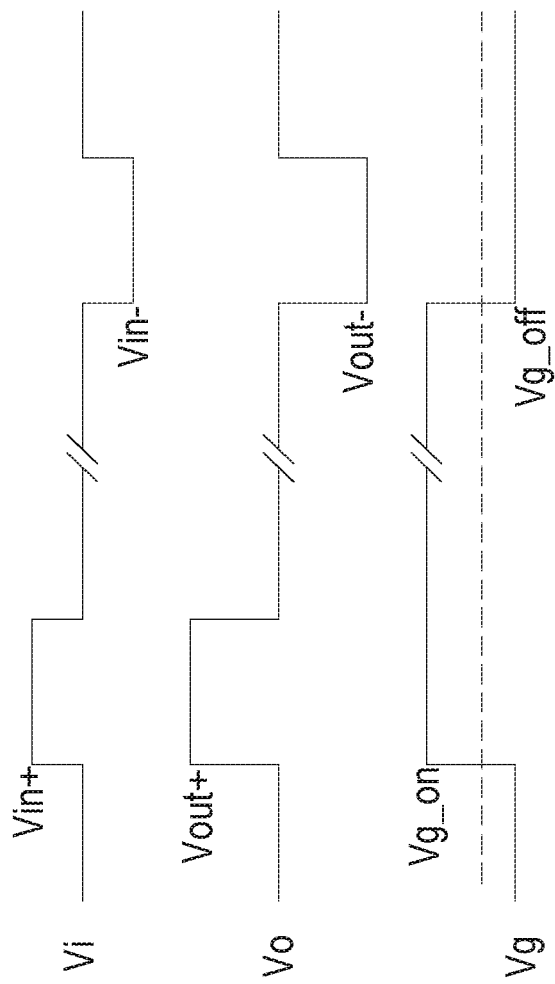
FIG. 12 shows sequence diagram of the voltage of the electronic switch of FIG. 11.

FIG. 11 is a schematic circuit diagram illustrating the electronic switches of the hybrid circuit breaker of FIG. 2. FIG. 12 shows sequence diagram of the voltage of the electronic switch of FIG. 11. As shown in FIG. 11, at least two electronic switch 33 are controlled by a driving circuit. The first electronic switch 33 includes a first secondary side circuit 331 and a first transistor T1. The first secondary side circuit 331 includes a first diode bridge 331a and a second diode bridge 331b. The first diode bridge 331a includes a first diode D1 and a second diode D2. An anode of the first diode D1 and a cathode of the second diode D2 are connected with each other in series with a third node C. The second diode bridge 331b includes a third diode D3 and a fourth diode D4. An anode of the third diode D3 and a cathode of the fourth diode D4 are connected with each other in series with a fourth node D. The first transistor T1 is connected with the first diode bridge 331a and the second diode bridge 331b in parallel.

The second electronic switch 33 includes a second secondary side circuit 332 and a second transistor T2. The second secondary side circuit 332 includes a third diode bridge 332a and the fourth diode bridge 332b. The third diode bridge 332a includes a fifth diode D5 and a sixth diode D6. An anode of the fifth diode D5 and a cathode of the sixth diode D6 are connected with each other in series with a fifth node E. The fourth diode bridge 332b includes a seventh diode D7 and an eighth diode D8. An anode of the seventh diode D7 and a cathode of the eighth diode D8 are connected with each other in series with a sixth node F. The sixth node F is connected with the third node C. The second transistor T2 is connected with the third diode bridge 332a and the fourth diode bridge 332b in parallel.

The driving circuit includes a transformer 333, a trigger generator 334, a primary side circuit, a first secondary side circuit and a second secondary side circuit. The primary side circuit includes a transformer capacitor TC. The first secondary side circuit includes a first Zener diode DZ1, a second Zener diode DZ2 and a first resistor R1. The first resistor R1 is connected between the first transistor T1 and first Zener diode DZ1. The second Zener diode DZ2 is connected with the first transistor T1. The second secondary side circuit includes a third Zener diode DZ3, a fourth Zener diode DZ4 and a second resistor R2. The second resistor R2 is connected between the second transistor T2 and third Zener diode DZ3. The fourth Zener diode DZ4 is connected with the second transistor T2.

The transformer 333 includes a primary winding 333a, a first secondary winding 333b and a second secondary winding 333c. The primary winding 333a is connected with the trigger generator 334. The trigger generator 334 generates a trigger to the primary winding 333a. The first secondary winding 333b is coupled with the primary winding 333a and connected between the first Zener diode DZ1 and the second Zener diode DZ2. The second secondary winding 333c is coupled with the primary winding 333a and connected between the third Zener diode DZ3 and the fourth Zener diode DZ4. In this embodiment, the transformer capacitor TC is connected between the trigger generator 334 and the primary winding 333a.

As shown in FIG. 12, Vi represents the voltage of the primary winding 333a (i.e., the trigger voltage generated by the trigger generator 334), Vo represents the voltage of the first secondary winding 333b (or the second secondary winding 333c), and Vg represents the gating voltage of the first transistor T1 (or the second transistor T2). When the trigger generator 334 generates the positive voltage Vin+, the first secondary winding 333b (or the second secondary winding 333c) generates the positive voltage Vout+.

Figure 13:
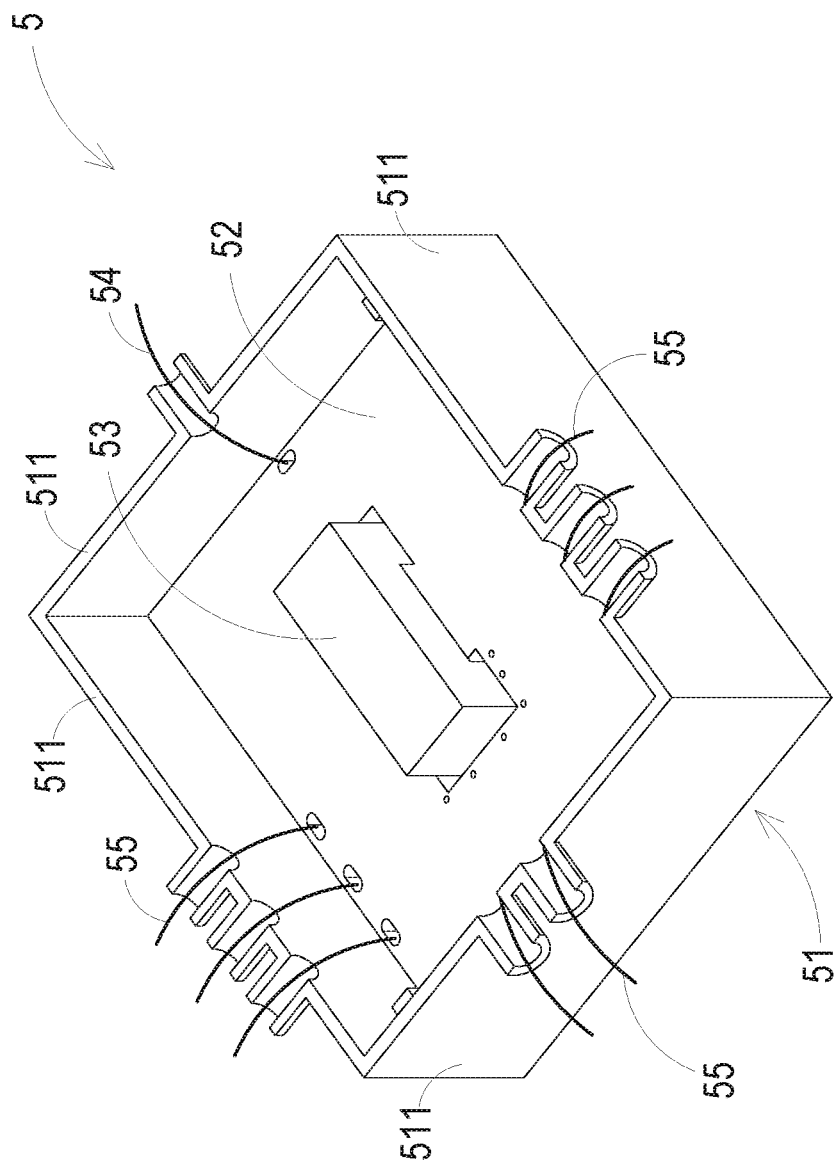
FIG. 13 is a schematic perspective view illustrating a magnetic device forming the transformer of the electronic switch of FIG. 11.

FIG. 13 is a schematic perspective view illustrating a magnetic device forming the transformer of the electronic switch of FIG. 11. As shown in FIG. 13, the magnetic device 5 structurally forms the transformer 333 of the electronic switch 33 of FIG. 11. The magnetic device 5 includes a container 51, a circuit board 52, a magnetic core 53, a primary side connection wire pair 54, a plurality of secondary side connection wire pairs 55 and an insulation material. The container 51 includes a plurality of lateral walls 511. The container 51 is provided with the primary side connection wire pair 54, the plurality of secondary side connection wire pairs 55 and the magnetic core 53. The circuit board 52 is disposed within the container 51. The magnetic core 53 is disposed through the circuit board 52 and disposed within the container 51. At least portion of the primary side connection wire pair 54 is disposed within the container 51 and adjacent to corresponding one of the plurality of lateral walls 511. At least portion of each secondary side connection wire pair 55 is disposed within the container 51 and adjacent to different one of the plurality of lateral walls 511. Other portion of each secondary side connection wire pair 55 is exposed from the interior of the container 51. The insulation material is filled within the container 51. The circuit board 52, the magnetic core 53, at least portion of the primary side connection wire pair 54 and at least portion of each secondary side connection wire pair 55 are embedded in the insulation material. Another portion of each primary side connection wire pair 54 and another portion of each secondary side connection wire pair 55 are connected to the circuit board 52. A space inside the container 51 is filled with the insulation material. For showing the structure clearly, the insulation material is omitted in FIG. 13. In an embodiment, the insulation material can be made of silicone gel, epoxy, mineral oil, or other types of insulation gel or liquid. The magnetic device 5 forming the transformer 333 of the electronic switch 33 has the advantages of easy fabrication, low cost, consistent circuit parameters and performance, reduced clearance and creepage distance requirements, and small size.

FIG. 14A is a schematic perspective view illustrating a layer of the circuit board of the magnetic device of FIG. 13. As shown in FIGS. 13 and 14A, the circuit board 52 is a PCB board with multi-layer structures. For explaining easily, one layer of the multi-layer structures of the circuit board 52 is shown in FIG. 14A. The first layer 56 includes a plurality of soldering points 561, a primary winding 562 and a secondary winding 563. Each soldering point 561 is connected with the corresponding primary side connection wire pair 54 or the corresponding secondary side connection wire pair 55. The primary winding 562 is connected with the primary side connection wire pair 54 through the corresponding soldering point 561. The secondary winding 563 is connected with the secondary side connection wire pair 55 through the corresponding soldering point 561.

Figure 14B:
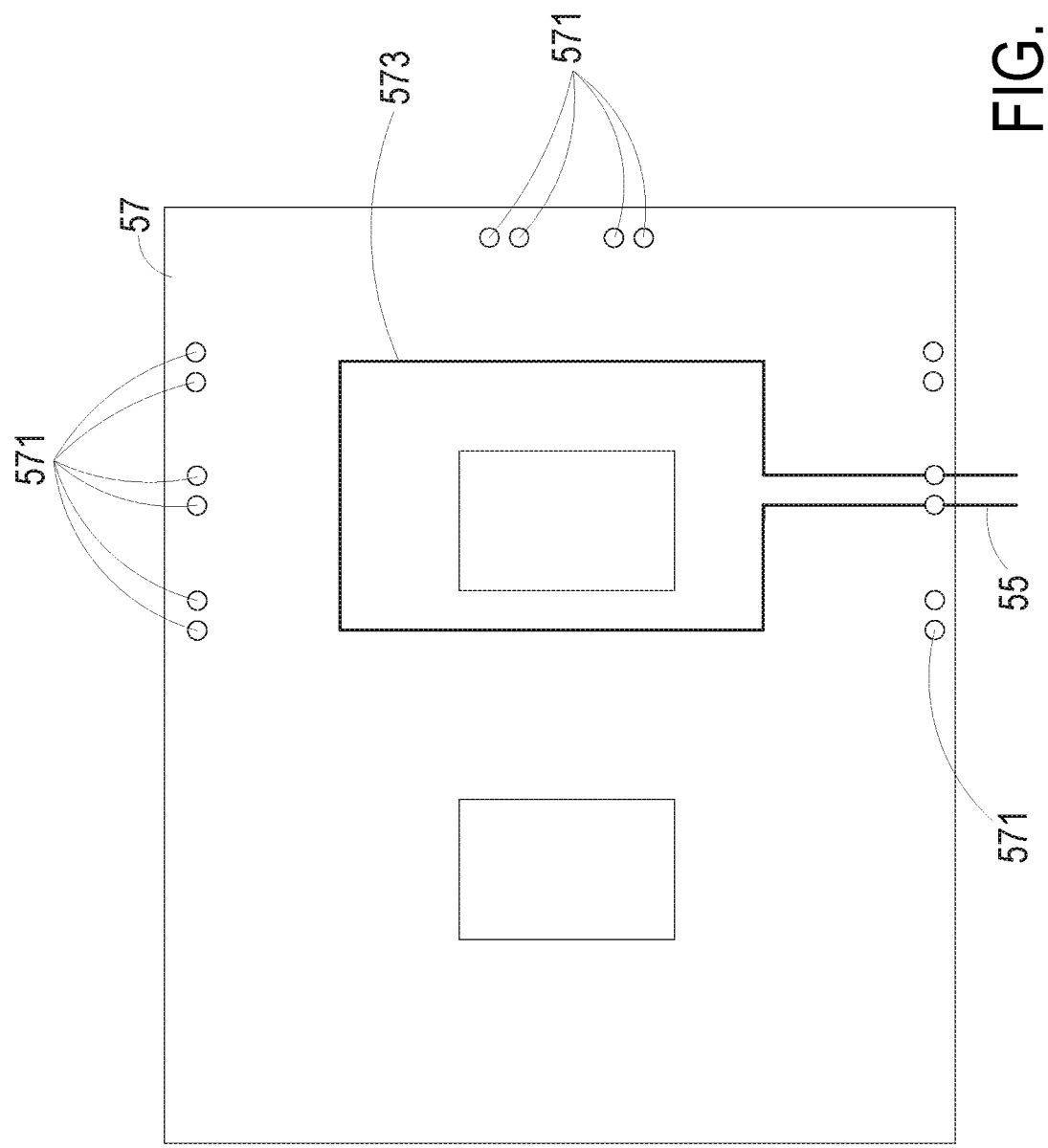
FIG. 14B is a schematic perspective view illustrating another layer of the circuit board of the magnetic device of FIG. 13.

FIG. 14B is a schematic perspective view illustrating another layer of the circuit board of the magnetic device of FIG. 13. For explaining easily, one layer of the multi-layer structures of the circuit board 52 is shown in FIG. 14B. The second layer 57 includes a plurality of soldering points 571 and a secondary winding 573. Each soldering point 571 is connected with the corresponding primary side connection wire pair 54 or the corresponding secondary side connection wire pair 55. The secondary winding 573 is single wire or twisted pair, and connected with the secondary side connection wire pair 55 through the corresponding soldering point 571. In an embodiment, the circuit board 52 includes one first layer 56 and a plurality of second layer 57. Namely, multiple secondary windings 563, 573 are arranged on complex layers of the PCB board, and at least one primary winding 561, 571 is arranged on at least one layer of the PCB board.

Figure 15:
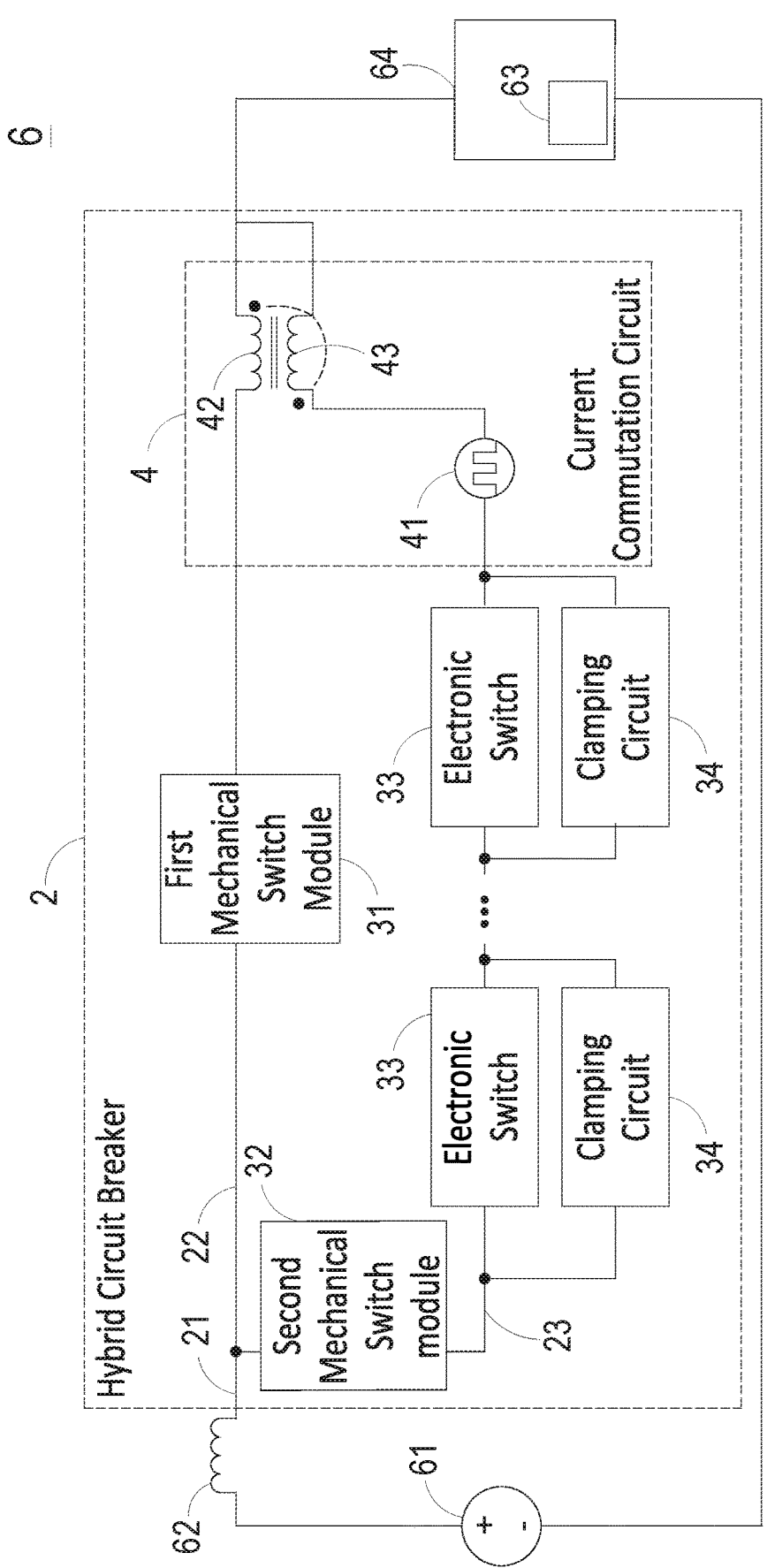
FIG. 15 is a schematic circuit diagram illustrating the hybrid circuit breaker of the present disclosure applied to a DC circuit system.
Figure 16:
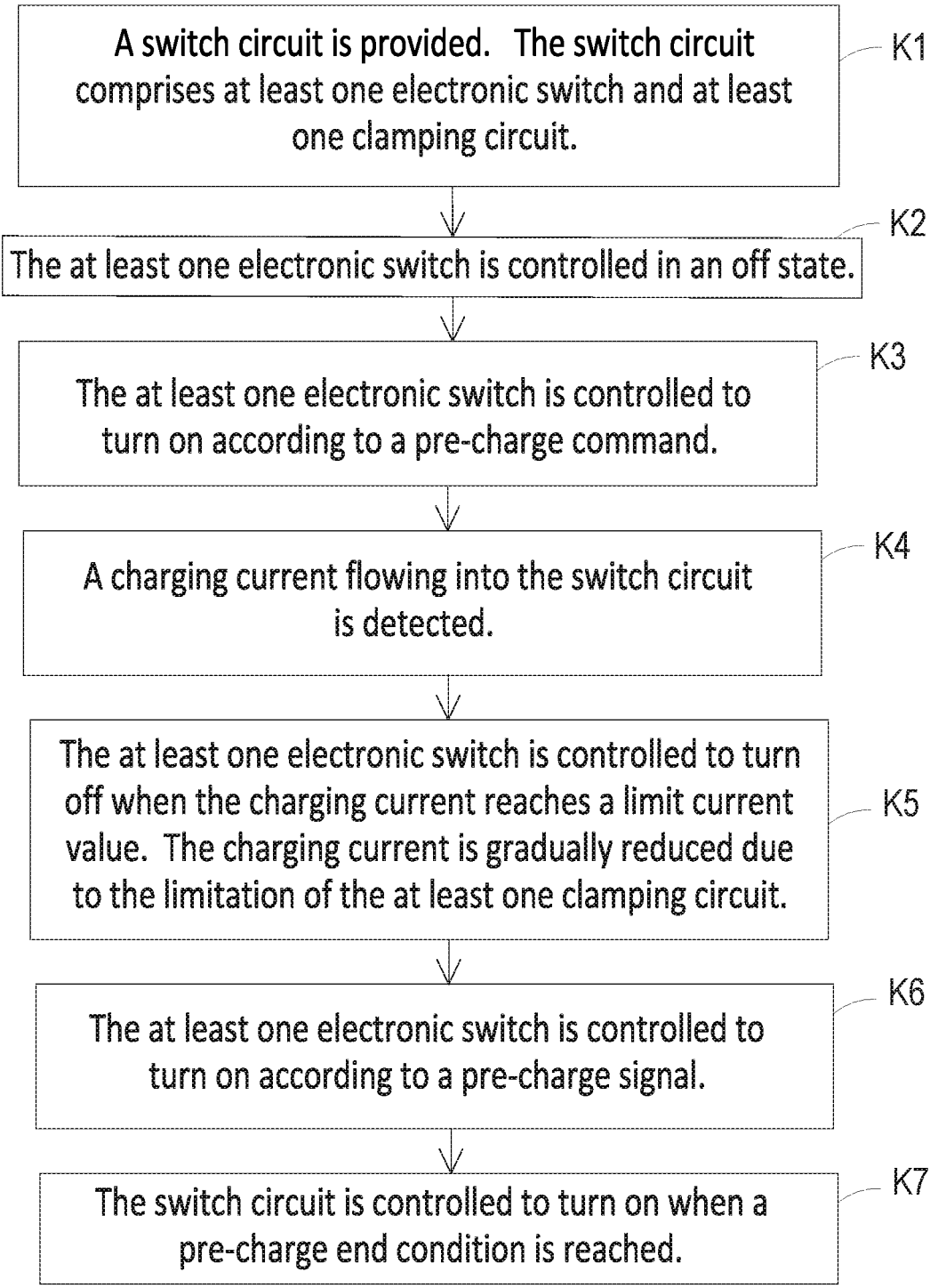
FIG. 16 is a flowchart illustrating a pre-charge control method applied to the hybrid circuit breaker of FIG. 15.
Figure 17:
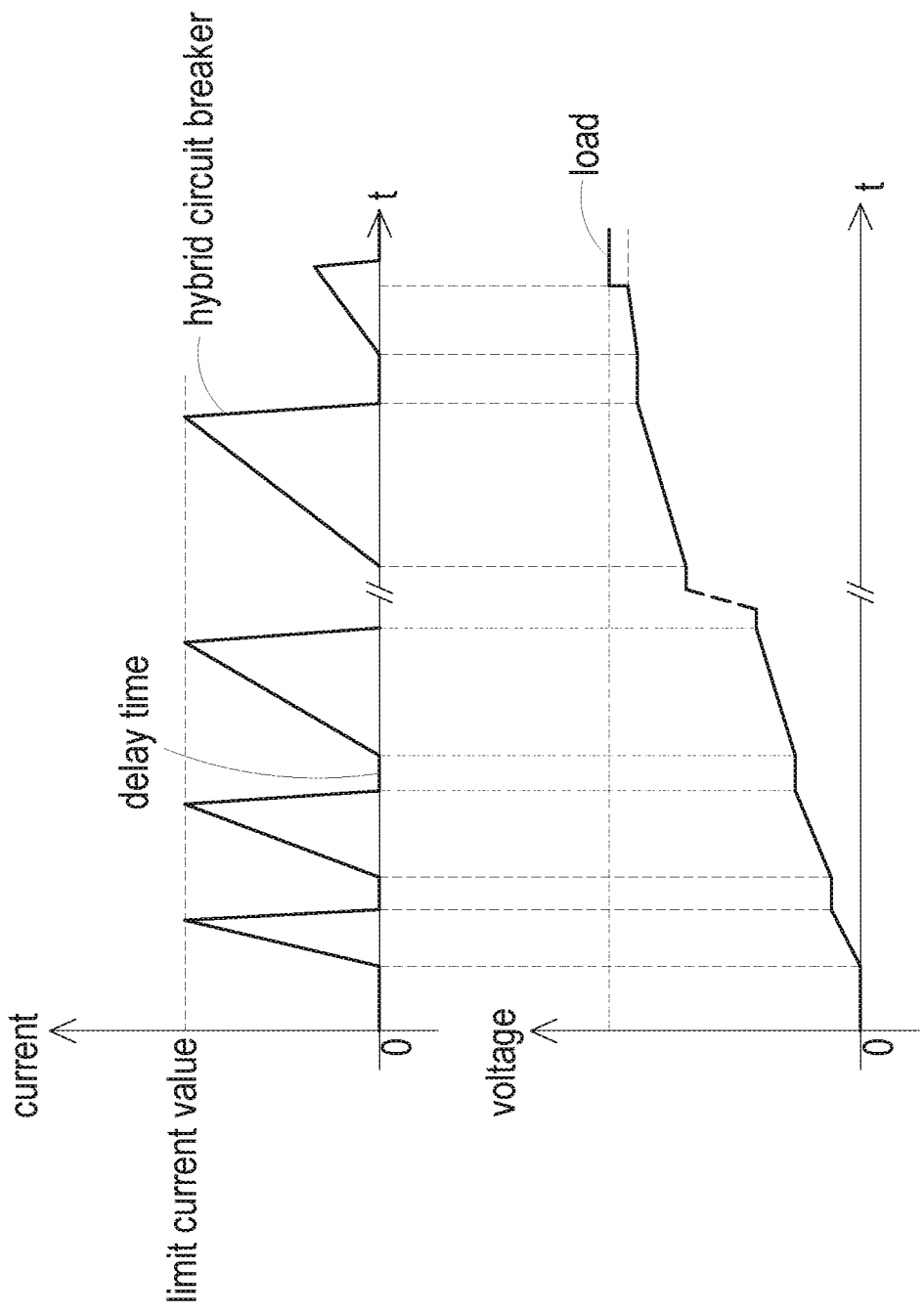
FIG. 17 shows sequence diagram of the current of the hybrid circuit breaker and the voltage of the load of the DC circuit system of FIG. 15.

FIG. 15 is a schematic circuit diagram illustrating the hybrid circuit breaker of the present disclosure applied to a DC circuit system. FIG. 16 is a flowchart illustrating a pre-charge control method applied to the hybrid circuit breaker of FIG. 15. FIG. 17 shows sequence diagram of the current of the hybrid circuit breaker and the voltage of the load of the DC circuit system of FIG. 15. As shown in FIG. 15, the hybrid circuit breaker 2 is applied to a DC circuit system 6. The DC circuit system 6 includes a DC power source 61, a DC inductor 62, a capacitor module 63 and a power electric converter 64. The DC inductor 62 and the hybrid circuit breaker 2 are connected between the positive terminal of the DC power source 61 and the one end of the power electric converter 64. The capacitor module 63 is located in the power electric converter 64. In an embodiment, the capacitor module 63 includes one or more capacitors, wherein the plural capacitors can be connected in parallel, series, parallel-series or any connection relationship. The power electric converter 64 converts the voltage of the capacitor module 63 to the external electric element (not shown).

As shown in FIG. 16, firstly, a step K1 is performed. In the step K1, a switch circuit is provided. The switch circuit comprises at least one electronic switch 33 and at least one clamping circuit 34. Then, a step K2 is performed. In the step K2, the at least one electronic switch 33 is controlled in an off state. Then, a step K3 is performed. In the step K3, the at least one electronic switch 33 is controlled to turn on according to a pre-charge command. Then, a step K4 is performed. In the step K4, a charging current (i.e., the first current i1) flowing into the switch circuit is detected. Then, a step K5 is performed. In the step K5, the at least one electronic switch 33 is controlled to turn off when the charging current reaches a limit current value. The charging current is gradually reduced due to the limitation of the at least one clamping circuit 34. Then, a step K6 is performed. In the step K6, the at least one electronic switch 33 is controlled to turn on according to a pre-charge signal. Then, a step K7 is performed. In the step K7, the switch circuit is controlled to turn on when a pre-charge end condition is reached.

In an embodiment, the pre-charge command is a command indicating the DC circuit system to pre-charge. The pre-charge signal is determined according to a time when the charging current is reduced to zero. The pre-charge end condition is a difference between a voltage of the capacitor module and a voltage of the power source. The pre-charge end condition is less than a preset difference.

As shown in FIG. 17, when the hybrid circuit breaker 2 outputs current to the capacitor module 63, the capacitor module 63 is charged. In other words, when the current of the hybrid circuit breaker 2 is increased, the voltage of the capacitor module 63 is increased. When the current of the hybrid circuit breaker 2 reaches the threshold, such as the limit current value of FIG. 17, the electronic switch 33 is controlled to turn off, and the current of the hybrid circuit breaker 2 is reduced. At the same time, the capacitor module 63 stops being charged. In other words, when the current of the hybrid circuit breaker 2 is decreased to zero, the voltage of the capacitor module 63 stops increasing.

The hybrid circuit breaker 2 repeats the above charging method until the voltage of the capacitor module 63 reaches a pre-charge end condition. The charging current is determined by a tolerance of the electronic switch.

Figure 18:
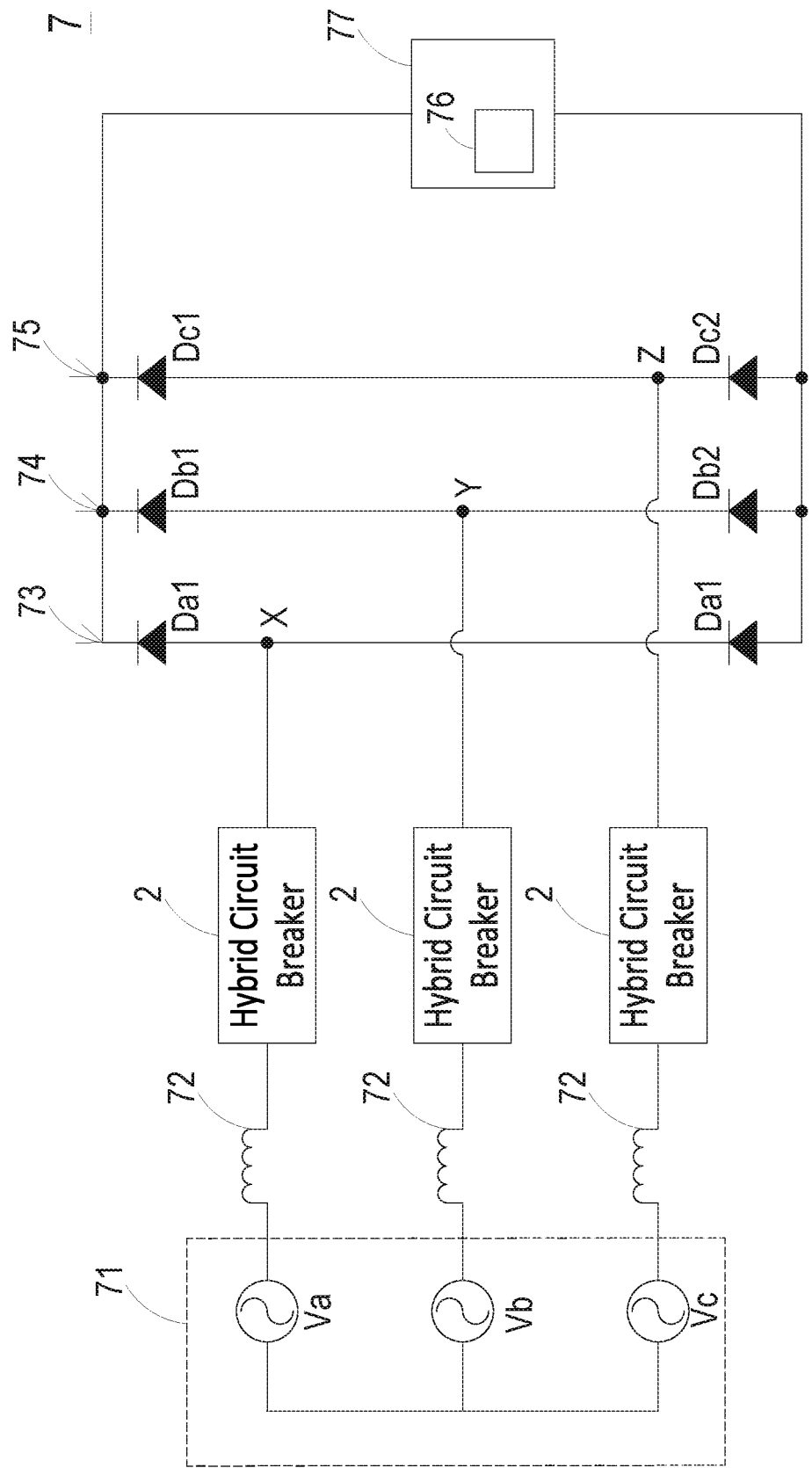
FIG. 18 is a schematic circuit diagram illustrating the hybrid circuit breakers of the present disclosure applied to a three-phase AC circuit system.
Figure 19:
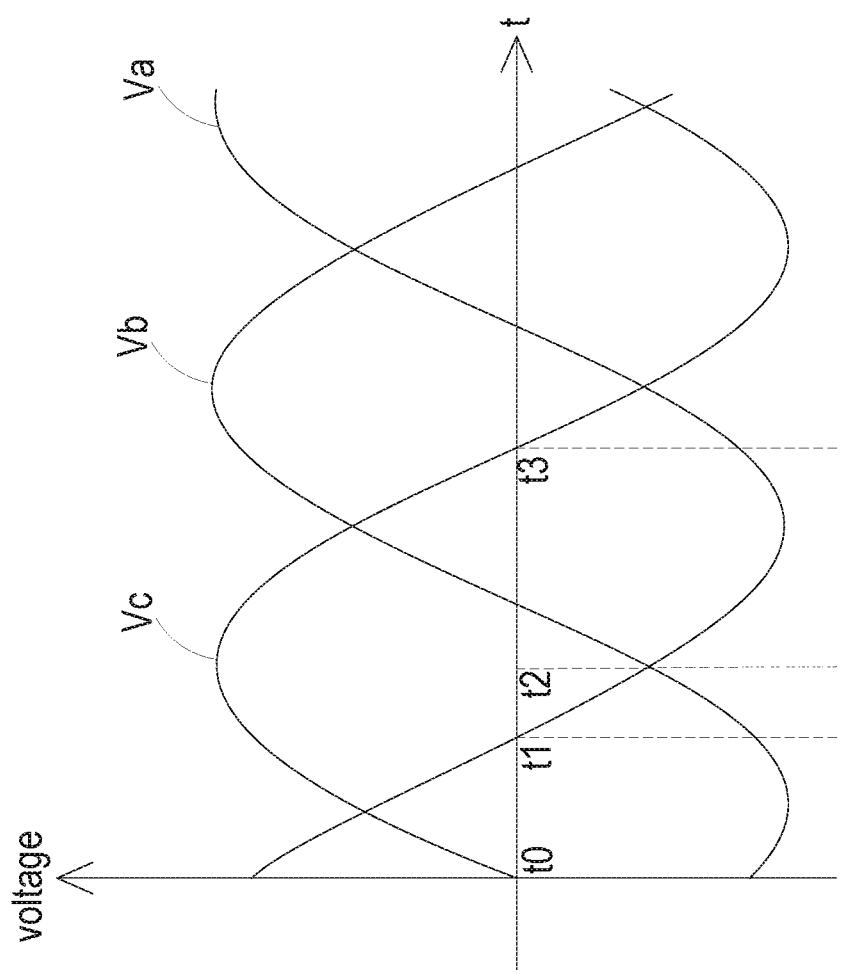
FIG. 19 shows sequence diagram of the voltage provided by the three-phase AC circuit system.

FIG. 18 is a schematic circuit diagram illustrating the hybrid circuit breakers of the present disclosure applied to a three-phase AC circuit system. FIG. 19 shows sequence diagram of the voltage provided by the three-phase AC circuit system. FIG. 20 is a flowchart illustrating a pre-charge control method applied to the hybrid circuit breaker of FIG. 18. As shown in FIG. 18, three hybrid circuit breakers 2 are applied to a three-phase AC circuit system 7. For example, a first hybrid circuit breaker 2, a second hybrid circuit breaker 2 and a third hybrid circuit breaker 2 are applied to the three-phase AC circuit system 7. The three-phase AC circuit system 7 includes an AC power source 71, three AC inductors 72, a first AC diode bridge 73, a second AC diode bridge 74, a third AC diode bridge 75, a capacitor module 76 and a power electric converter 77. The AC power source 71 provides three-phase voltage and includes a first phase terminal Va, a second phase terminal Vb and a third phase terminal Vc. The AC power source 71 provides a first phase voltage of the three-phase voltage through the first phase terminal Va. The AC power source 71 provides a second phase voltage of the three-phase voltage through the second phase terminal Vb. The AC power source 71 provides a third phase voltage of the three-phase voltage through the third phase terminal Vc. The three voltage phases of the first phase terminal Va, the second phase terminal Vb and the third phase terminal Vc are shown in FIG. 19.

The first AC diode bridge 73 includes a first AC diode Da1 and a second AC diode Da2 connected in series with a first AC node X. The first AC inductor 72 and the first hybrid circuit breaker 2 are connected in series and between the first phase terminal Va of the AC power source 71 and the first AC node X. The second AC diode bridge 74 includes a third AC diode Db1 and a fourth AC diode Db2 connected in series with a second AC node Y. The second AC inductor 72 and the second hybrid circuit breaker 2 are connected in series and between the second phase terminal Vb of the AC power source 71 and the second AC node Y. The third AC diode bridge 75 includes a fifth AC diode Dc1 and a sixth AC diode Dc2 connected in series with a third AC node Z. The third AC inductor 72 and the third hybrid circuit breaker 2 are connected in series and between the third phase terminal Vc of the AC power source 71 and the third AC node Z. The first AC diode bridge 73, the second AC diode bridge 74, the third AC diode bridge 75 and the power electric converter 77 are connected in parallel.

As shown in FIG. 20, a step J1 is performed. In the step J1, a first phase voltage of the three-phase voltage is provided to the first hybrid circuit breaker 2 through the first phase terminal Va. A second phase voltage of the three-phase voltage is provided to the second hybrid circuit breaker 2 through the second phase terminal Vb. A third phase voltage of the three-phase voltage is provided to the third hybrid circuit breaker 2 through the third phase terminal Vc. Then, a step J2 is performed. In the step J2, the first hybrid circuit breaker 2, the second hybrid circuit breaker 2 and the third hybrid circuit breaker 2 are controlled in an off state. Then, a step J3 is performed. In the step J3, the first hybrid circuit breaker 2 is controlled to turn on when the first phase voltage of the three-phase voltage is equal to zero. Then, a step J4 is performed. In the step J4, the second hybrid circuit breaker 2 is controlled to turn on when the first phase voltage of the three-phase voltage is equal to the second phase voltage of the three-phase voltage. Then, a step J5 is performed. In the step J5, the third hybrid circuit breaker 2 is controlled to turn on when the third phase voltage of the three-phase voltage is equal to zero. The step J5 is corresponding to the time t3 of FIG. 19. In this embodiment, each hybrid circuit breaker 2 is maintained on turning on but not to turn off.

In this embodiment, a first delay time is existed between the time of turning on the first hybrid circuit breaker 2 and the time of turning on the second hybrid circuit breaker 2. The first delay time is corresponding to the time interval between t1 and t2 of FIG. 19. A second delay time is existed between the time of turning on the second hybrid circuit breaker 2 and the time of turning on the third hybrid circuit breaker 2. The second delay time is corresponding to the time interval between t2 and t3 of FIG. 19. In this embodiment, the time of turning on the first hybrid circuit breaker 2, the time of turning on the second hybrid circuit breaker 2 and the time of turning on the third hybrid circuit breaker 2 are existed on the same line voltage cycle of the three-phase voltage. In some embodiments, the time of turning on the first hybrid circuit breaker 2, the time of turning on the second hybrid circuit breaker 2 and the time of turning on the third hybrid circuit breaker 2 are not existed on the same line voltage cycle of the three-phase voltage but existed on the different line voltage cycle of the three-phase voltage according to the practical requirements.

In some embodiments, the pre-charge control method is not only applied to the power system, but also applied to a three-phase AC circuit system with any types of the circuit breaker system, such as mechanical circuit breaker system and solid-state circuit breaker system.

As mentioned above, the hybrid circuit breaker of the present disclosure includes the second mechanical switch module located on the second branch. Compared with the conventional hybrid circuit breaker, the first mechanical switch module and the second mechanical switch module can use plural low-voltage rated mechanical switches connected in series to replace a high-voltage rated mechanical switch while maintain galvanic isolation function, respectively. Consequently, the cost of the first mechanical switch module and the second mechanical switch module of the hybrid circuit breaker is reduced. Moreover, the second mechanical switch module of the hybrid circuit breaker includes a switch element and two conductor parts. A fixed parasitic capacitance value is between the two conductor parts. In other words, the two conductor parts have sufficient voltage insulation ability and well-designed parasitic capacitance utilizing for voltage balance of switch element while maintaining galvanic isolation, so that the second mechanical switch module of the hybrid circuit breaker of the present disclosure is stabled. Moreover, the hybrid circuit breaker of the present disclosure includes the current commutation circuit to control the current of the hybrid circuit breaker, and there is no electronic switch connected in series with the first mechanical switch module on the first branch. Consequently, the power loss and operation reliability of the hybrid circuit breaker are improved. Moreover, the transformer of the electronic switch of the hybrid circuit breaker is formed by the magnetic device. The magnetic device includes the insulation material filled within the container. Consequently, the magnetic device forming the transformer of the electronic switch has the advantages of easy fabrication, low cost, consistent circuit parameters and performance, reduced clearance and creepage distance requirements, and small size. Furthermore, the hybrid circuit breaker of the present disclosure can be applied to a DC circuit system or an AC circuit system for pre-charging the load of the DC circuit system or the AC circuit system. The function of the hybrid circuit breaker of the present disclosure is variety.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hybrid circuit breaker, comprising:
    an outer branch;
    a first branch connected with the outer branch in series;
    a first mechanical switch module located on the first branch;
    a second branch connected with the first branch in parallel;
    an electronic switch located on the second branch; and
    a current commutation circuit comprising a voltage source module and a first inductor, wherein the voltage source module is located on the second branch, the first inductor is located on the first branch or the second branch.

2. The hybrid circuit breaker according to claim 1, wherein the hybrid circuit breaker comprises a second mechanical switch module located on one of the outer branch or the second branch.

3. The hybrid circuit breaker according to claim 1, wherein the second mechanical switch module is located on the second branch, wherein the first mechanical module and the second mechanical switch module comprise a plurality of low-voltage rated switch elements and a plurality of conductor parts, respectively, the plurality of low-voltage rated switch elements are connected in series, every two conductor parts of the plurality of conductor parts are connected with corresponding low-voltage rated switch element in parallel, and a fixed parasitic capacitance value is between the two conductor parts.

4. The hybrid circuit breaker according to claim 1, wherein the second mechanical switch module is located on the outer branch, wherein the second mechanical switch module comprises a plurality of low-voltage rated switch elements and a plurality of conductor parts, the plurality of low-voltage rated switch elements are connected in series, every two conductor parts of the plurality of conductor parts are connected with corresponding low-voltage rated switch element in parallel, and a fixed parasitic capacitance value is between the two conductor parts.

5. The hybrid circuit breaker according to claim 1, wherein the first inductor is located on the first branch, the current commutation circuit comprises a second inductor located on the second branch, and the second inductor and the first inductor are coupled with each other.

6. The hybrid circuit breaker according to claim 1, wherein the hybrid circuit breaker comprises at least one clamping circuit, the number of the at least one clamping circuit is equal to the number of the electronic switch, the at least one clamping circuit is located on the second branch and connected with the electronic switch in parallel.

7. The hybrid circuit breaker according to claim 1, wherein the hybrid circuit breaker comprises a driving circuit, wherein the driving circuit comprises a transformer, a primary side circuit and at least one secondary side circuit, the at least one secondary side circuit comprises a first Zener diode, a second Zener diode and a first resistor, the first resistor is connected between the electronic switch and first Zener diode, the transformer comprises a primary winding, at least one secondary winding, the primary winding is connected with a trigger generator through the primary side circuit, the at least one secondary winding is coupled with the primary winding and connected between the first Zener diode and the second Zener diode.

8. The hybrid circuit breaker according to claim 7, wherein the transformer has a container, and the inside of the container is provided with a PCB board with multi-layer structures, multiple secondary windings are arranged on the multi-layer structures of the PCB board, at least one primary winding is arranged on at least one layer of the PCB board, and a magnetic core, the primary side connection wire pair and the plurality of secondary side connection wire pairs are located on a circuit board, and a space inside the container is filled with insulation material.

9. A pre-charge control method for a DC circuit system, the DC circuit system comprising a switch circuit, a power source and a capacitor module, the switch circuit connected between the power source and the capacitor module, and the pre-charge control method comprising:
providing the switch circuit, wherein the switch circuit comprises at least one electronic switch and at least one clamping circuit;
controlling the at least one electronic switch in an off state;
controlling the at least one electronic switch to turn on according to a pre-charge command;
detecting a charging current flowing into the switch circuit;
controlling the at least one electronic switch to turn off when the charging current reaching a limit current value, wherein the charging current is gradually reduced due to the limitation of the at least one clamping circuit;
controlling the at least one electronic switch to turn on according to a pre-charge signal; and
controlling the switch circuit to turn on when reaching a pre-charge end condition.

10. The pre-charge control method according to claim 9, wherein the pre-charge command is a command indicating the DC circuit system to pre-charge, the pre-charge signal is determined according to a time when the charging current is reduced to zero.

11. The pre-charge control method according to claim 9, wherein the pre-charge end condition is a difference between a voltage of the capacitor module and a voltage of the power source, wherein the pre-charge end condition is less than a preset difference.

12. The pre-charge control method according to claim 9, a first delay time is existed between two times of turning on the DC circuit system.

13. The pre-charge control method according to claim 9, wherein the charging current is determined by a tolerance of the at least one electronic switch.

14. A pre-charge control method for a three-phase AC circuit system, and the three-phase AC circuit system comprising a first hybrid circuit breaker, a second hybrid circuit breaker, a third hybrid circuit breaker and an AC power source, the AC power source providing a three-phase voltage and comprising a first phase terminal, a second phase terminal and a third phase terminal, and the pre-charge control method comprising:
providing a first phase voltage of the three-phase voltage to the first hybrid circuit breaker through the first phase terminal, providing a second phase voltage of the three-phase voltage to the second hybrid circuit breaker through the second phase terminal, and providing a third phase voltage of the three-phase voltage to the third hybrid circuit breaker through the third phase terminal;
controlling the first hybrid circuit breaker, the second hybrid circuit breaker and the third hybrid circuit breaker in an off state;
controlling the first hybrid circuit breaker to turn on when the first phase voltage of the three-phase voltage is equal to zero;
controlling the second hybrid circuit breaker to turn on when the first phase voltage of the three-phase voltage is equal to the second phase voltage of the three-phase voltage;
controlling the third hybrid circuit breaker to turn on when the third phase voltage of the three-phase voltage is equal to zero.

* * * * *